United States Patent
Li et al.

(10) Patent No.: US 12,316,447 B2
(45) Date of Patent: May 27, 2025

(54) BIT ERROR INDICATION METHOD FOR SERVICE STREAM AND COMMUNICATION APPARATUS

(71) Applicant: HUAWEI TECHNOLOGIES CO., LTD., Guangdong (CN)

(72) Inventors: Rixin Li, Dongguan (CN); Jingfeng Chen, Dongguan (CN); Li Xu, Shenzhen (CN); Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 18/154,160

(22) Filed: Jan. 13, 2023

(65) Prior Publication Data
US 2023/0171027 A1   Jun. 1, 2023

Related U.S. Application Data

(63) Continuation of application No. PCT/CN2021/104046, filed on Jul. 1, 2021.

(30) Foreign Application Priority Data

Jul. 14, 2020   (CN) ......................... 202010674067.9

(51) Int. Cl.
*H04L 1/00*   (2006.01)
*G06F 11/00*   (2006.01)
*G06F 11/07*   (2006.01)

(52) U.S. Cl.
CPC ........ *H04L 1/0057* (2013.01); *G06F 11/0709* (2013.01); *G06F 11/076* (2013.01)

(58) Field of Classification Search
CPC ... H04L 1/0057; H04L 1/0041; H04L 1/0045; H04L 1/0061; H04L 1/0063;
(Continued)

(56) References Cited

U.S. PATENT DOCUMENTS 10,797,816 B1 * 10/2020 Gorshe ............... H04L 43/0847
10,951,340 B2 *  3/2021 Liu .......................... H04B 17/30
(Continued)

OTHER PUBLICATIONS

Zte and China Mobile:"ITU-T SG15: G.mtn Metro Transport Network + Transport Support for IMT2020/5G Networks", Nov. 5, 2018, total 8 pages.
(Continued)

*Primary Examiner* — Justin R Knapp

(57) ABSTRACT

A bit error indication method for a service stream and a related communication apparatus are disclosed. According to the method, when a quantity of bit errors that is counted inside a device exceeds a preset threshold, it can be ensured that the device continues to work normally. The method includes: A network device receives a first signal stream from a first node by using N slots of a first bonding group, determines a first check value based on a first check code in the first signal stream, determines a second check value based on the first check value and a current check value, and sends a second signal stream to a second node by using M slots of the first bonding group. The second signal stream includes a target check value determined based on the second check value.

20 Claims, 15 Drawing Sheets

(58) Field of Classification Search
CPC .. H04L 1/0082; G06F 11/0709; G06F 11/076; H04J 3/1652; H04J 2203/0085
See application file for complete search history.

(56) References Cited

U.S. PATENT DOCUMENTS

| | | | |
|---|---|---|---|
| 11,115,153 B2* | 9/2021 | Zhang | H04L 1/1614 |
| 11,290,131 B2* | 3/2022 | Xu | H04L 1/203 |
| 11,310,138 B2* | 4/2022 | Zhang | H04L 69/323 |
| 2020/0007256 A1 | 1/2020 | Liu | |

OTHER PUBLICATIONS

Technical Editor: "Flex Ethernet Implementation Agreement 2.1" .IA OIF FLEXE-02.1, IA Flex Ethernet 2.1 Implementation Agreement, Jul. 2019, total 56 pages.
Extended European Search Report issued in 21841679.0, dated Nov. 28, 2023, 8 pages.

* cited by examiner

FIG. 6

BIT ERROR INDICATION METHOD FOR SERVICE STREAM AND COMMUNICATION APPARATUS

CROSS-REFERENCE TO RELATED APPLICATIONS

This application is a continuation of International Application No. PCT/CN2021/104046, filed on Jul. 1, 2021, which claims priority to Chinese Patent Application No. 202010674067.9, filed on Jul. 14, 2020. The disclosures of the aforementioned applications are hereby incorporated by reference in their entireties.

TECHNICAL FIELD

The present disclosure relates to the field of Ethernet technologies, and in particular, to a bit error indication method for a service stream and a communication apparatus.

BACKGROUND

For the flexible Ethernet (FlexE), the flexible Ethernet (FlexE) combines some technical features of an Ethernet and a transport network (for example, an optical transport network (OTN) and a synchronous digital hierarchy (SDH)). With emergence of FlexE technologies, an Ethernet physical interface presents a virtualization characteristic. A plurality of Ethernet physical interfaces may be cascaded, to support several virtual logical ports. ITU-T defines a new generation transport network technology system (metro transport network, MTN) for a new service requirement such as 5G on the basis of FlexE logic. The MTN is a new transport network layered network formed by an MTN section layer and an MTN path layer.

When a service stream is transmitted in a transport network, an error is inevitable, that is, a bit error occurs in the service stream. To verify validity of the service stream, a current mainstream practice is to verify the service stream by using a parity-check code. A source device sends an original code stream and a check code to a sink device. After receiving the original code stream, the sink device may locally calculate a quantity of check values included in the original code stream. The sink device may compare a quantity of check values that is received from the source device and the calculated quantity of check values, to determine whether a bit error exists in the original code stream. In addition, to complete a complete error detection mechanism, the sink device needs to return information such as a counted bit error result to the source device.

Because transmission is performed based on an Ethernet underlying protocol stack and an Ethernet optical module in FlexE/MTN, a frequency offset exists between any two ports on a transmission link. Consequently, when the source device sends one check code, the sink device may receive a plurality of check codes, causing an error in a counted bit error result. Although a quantity of bit errors obtained from a bit error result counted each time does not exceed 8, the sink device accumulates the quantity of bit errors. In this case, the quantity of bit errors may exceed 8 or even exceed 16. Currently, a remote error indication (REI) used to carry the quantity of bit errors occupies 4 bits, and can represent a maximum of 16 bit errors. It may be learned that due to the frequency offset, the current REI may not be used to accurately indicate the bit error result, and consequently the device cannot work normally.

SUMMARY

The present disclosure provides a bit error indication method for a service stream and a communication apparatus, so that when a quantity of bit errors that is counted inside a device exceeds a preset threshold, it can be ensured that the device continues to work normally.

According to a first aspect, an embodiment of the present disclosure provides a bit error indication method for a service stream. The method may be performed by a first communication apparatus. The first communication apparatus may be a network device in a FlexE or MTN network or a communication apparatus that can support the network device in implementing a function required by the method, for example, a chip or a chip system. The following is described by using an example in which the first communication apparatus is a network device. The method includes: The network device receives a first signal stream from a first node by using N slots of a first bonding group, where the first signal stream includes a first check code, the first check code is used to determine a quantity of bit errors included in the first signal stream, the first bonding group includes P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1; the network device determines a first check value based on the first check code, determines a second check value based on the first check value and a current check value, and updates the current check value by using the second check value, where the current check value is a check value stored by the network device before receiving the first signal stream; and the network device sends a second signal stream to a second node by using M slots of the first bonding group, where the second signal stream includes a second check code, the second check code includes a target check value, the target check value is determined based on the second check value, the target check value is less than or equal to a preset threshold, and M is an integer greater than or equal to 1.

In this embodiment, the network device may determine the second check value, namely, a to-be-stored check value, based on the first check value, namely, a quantity of bit errors, determined based on the first check code. The network device may determine, based on the second check value, the target check value in the second check code carried in the second signal stream, so that a quantity of bit errors that is indicated by the target check value does not exceed the preset threshold. In this way, because a frequency offset may exist between a transmit end and a receive end of the network device, even if a quantity of bit errors that is indicated by a bit error result counted inside the network device exceeds the preset threshold, the bit error result can be accurately indicated by using a REI that occupies 4 bits, to ensure that each device in a network works normally.

In a possible implementation, there are a plurality of manners in which the network device determines the first check value based on the first check code and determines the second check value based on the first check value and the current check value.

Example manner 1: That the network device determines a first check value based on the first check code, and determines a second check value based on the first check value and a current check value includes: The network device performs summation on the first check value and the current check value to obtain a third check value; and when the third check value is greater than the preset threshold, the network device determines the preset threshold as the second check value; or when the third check value is less than or equal to the preset threshold, the network device determines the third check value as the second check value. In this solution, before sending the second signal stream to the second node, the network device may accumulate a plurality of bit error results, that is, obtain the third check value. Because the third check value is a result obtained through accumulation, the third check value may be the preset threshold, or may be less than or equal to the preset threshold. In this solution, the network device may compare the third check value with the preset threshold, determine a smaller value in the third check value and the preset threshold as the second check value, and update the current check value by using the second check value, to ensure that a bit error result to be stored in a bit error counter does not exceed the preset threshold. The network device may directly obtain a check value in the bit error counter as the target check value. In this way, it can be ensured that the target check value carried in the second signal stream does not exceed the preset threshold.

Example manner 2: That the network device determines a first check value based on the first check code, and determines a second check value based on the first check value and a current check value includes: The network device performs summation on the first check value and the current check value to obtain a third check value; and the network device determines the third check value as the second check value, and updates the current check value by using the second check value. In this solution, before sending the second signal stream to the second node, the network device may accumulate a plurality of bit error results, that is, obtain the third check value, and store the third check value to a bit error counter.

Because the third check value is a result obtained through accumulation, the third check value may be the preset threshold, or may be less than or equal to the preset threshold. Therefore, in Manner 2, when the second check value is greater than the preset threshold, the network device may determine that the target check value is the preset threshold. Alternatively, when the second check value is less than or equal to the preset threshold, the network device may determine that the target check value is the second check value. In this solution, it can also be ensured that the target check value carried in the second signal stream sent by the network device to the second node does not exceed the preset threshold.

Example manner 3: That the network device determines a first check value based on the first check code, and determines a second check value based on the first check value and a current check value includes: The network device directly determines that the second check value is the first check value. In this solution, the network device updates the current check value to the first check value, that is, stores the first check value as the second check value. Before sending the second signal stream, the network device may use the stored second check value as the target check value. A check result obtained through single check does not exceed the preset threshold, for example, 8 or 16. Therefore, in this solution, it can also be ensured that the target check value carried in the second signal stream sent by the network device to the second node does not exceed the preset threshold.

Example manner 4: That the network device determines a first check value based on the first check code, and determines a second check value based on the first check value and a current check value includes: When the current check value is 0, the network device determines the first check value as the second check value; or when the current check value is not 0, the network device determines the current check value as the second check value. Compared with the foregoing Manner 3, in this solution, if the current check value is 0, the network device stores the obtained first check value as the second check value; or if the current check value is not 0, the network device discards the first check value, and remains the stored current check value unchanged. In this solution, it can also be ensured that a check value to be stored in a bit error counter does not exceed the preset threshold.

Example manner 5: That the network device determines a first check value based on the first check code, and determines a second check value based on the first check value and a current check value includes: The network device determines whether a current value of a preset counting mark k is 0; if the current value of the counting mark k is 0, the network device determines the current check value as the second check value; or if the current value of the counting mark k is not 0, the network device performs summation on the first check value and the current check value to obtain a third check value; and if the third check value is greater than the preset threshold, the network device determines the preset threshold as the second check value; or if determining that the third check value is less than or equal to the preset threshold, the network device determines the third check value as the second check value. In this solution, the counting mark k may be set, so that a quantity of times of accumulating the bit error result is limited by using k, to limit the bit error result. Therefore, the quantity of bit errors that is indicated by the bit error result does not exceed 8 or 16, and the bit error result can be accurately indicated by using a REI that occupies 4 bits. In addition, it is ensured that even if a frequency offset exists between a receive end and a transmit end of the network device, an existing protocol can be compatible, to ensure that each device in a network works normally.

According to a second aspect, an embodiment of the present disclosure provides a communication apparatus. The communication apparatus has a function of implementing a behavior of the network device in the method embodiment of the first aspect. The function may be implemented by hardware, or may be implemented by hardware executing corresponding software. The hardware or the software includes one or more modules corresponding to the foregoing function. In a possible implementation, the communication apparatus includes a processor and a transceiver.

The transceiver is configured to receive a first signal stream from a first node by using N slots of a first bonding group, where the first signal stream includes a first check code, the first check code is used to determine a quantity of bit errors included in the first signal stream, the first bonding group includes P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1.

The processor is configured to: determine a first check value based on the first check code, determine a second check value based on the first check value and a current check value, and update the current check value by using the second check value, where the current check value is a check value stored by the communication apparatus before receiving the first signal stream.

The transceiver is configured to send a second signal stream to a second node by using M slots of the first bonding group, where the second signal stream includes a second check code, the second check code includes a target check value, the target check value is determined based on the second check value, the target check value is less than or equal to a preset threshold, and M is an integer greater than or equal to 1.

In a possible implementation, the processor is specifically configured to:
perform summation on the first check value and the current check value to obtain a third check value; and
when the third check value is greater than the preset threshold, determine the preset threshold as the second check value; or when the third check value is less than or equal to the preset threshold, determine the third check value as the second check value.

In a possible implementation, the processor is specifically configured to:
perform summation on the first check value and the current check value to obtain a third check value; and
determine the third check value as the second check value.

In a possible implementation, when the second check value is greater than the preset threshold, the target check value is the preset threshold; or
when the second check value is less than or equal to the preset threshold, the target check value is the second check value.

In a possible implementation, the processor is specifically configured to:
use the first check value as the second check value.

In a possible implementation, the processor is specifically configured to:
when the current check value is 0, use the first check value as the second check value; or
when the current check value is not 0, use the current check value as the second check value.

In a possible implementation, the processor is specifically configured to:
determine whether a current value of a preset counting mark k is 0;
if the current value of the counting mark k is 0, determine the current check value as the second check value; or if the current value of the counting mark k is not 0, perform summation on the first check value and the current check value to obtain a third check value; and
if the third check value is greater than the preset threshold, determine the preset threshold as the second check value; or
if determining that the third check value is less than or equal to the preset threshold, determine the third check value as the second check value.

According to a third aspect, an embodiment of the present disclosure provides a communication apparatus, where the communication apparatus may be the network device in the second aspect in the foregoing embodiment, or may be a chip disposed in the network device in the second aspect. The communication apparatus includes a communication interface and a processor. Optionally, the communication apparatus further includes a memory. The memory is configured to store a computer program, instructions, or data, and the processor is coupled to the memory and the communication interface. When the processor reads the computer program, the instructions, or the data, the communication apparatus is enabled to perform the method performed by the network device in the foregoing method embodiment.

It should be understood that the communication interface may be a transceiver in the communication apparatus, for example, implemented by using a logic circuit, a transmit circuit, and a receive circuit in the communication apparatus. Alternatively, if the communication apparatus is a chip disposed in the network device, the communication interface may be an input/output interface of the chip, for example, an input/output pin. The transceiver is configured to perform communication between the communication apparatus and another device. For example, when the communication apparatus is a network device, the another device is a first node or a second node.

According to a fourth aspect, a communication apparatus is provided, where the communication apparatus is a sending apparatus or a receiving apparatus, and includes a processor and a memory. Optionally, the communication apparatus further includes a transceiver. The memory is configured to store a computer program or instructions. The processor is configured to invoke and run the computer program or the instructions from the memory. When the processor executes the computer program or the instructions in the memory, the communication apparatus is enabled to perform the method in the first aspect and any implementation of the method in the first aspect.

In a possible design, there are one or more processors, and there are one or more memories. The memory may be integrated with the processor, or may be independent of the processor. The transceiver may include a transmitter and a receiver that are coupled to each other.

According to a fifth aspect, an embodiment of the present disclosure provides a communication apparatus, including a transceiver unit and a processing unit, to perform the method in the first aspect and any implementation of the method in the first aspect. The transceiver unit is configured to perform functions related to sending and receiving. In a possible design, the transceiver unit includes a receiving unit and a sending unit. In a possible design, the communication apparatus is a communication chip, and the transceiver unit may be an input/output circuit or port of the communication chip.

In another design, the transceiver unit may be a transmitter and a receiver.

Optionally, the communication apparatus further includes modules configured to perform any implementation of the method in the first aspect.

According to a sixth aspect, a communication apparatus is provided, including an input circuit, an output circuit, and a processing circuit. The processing circuit is configured to: receive a signal by using the input circuit, and transmit a signal by using the output circuit, so that the method in any possible implementation of the first aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of the present disclosure.

According to a seventh aspect, an embodiment of the present disclosure provides a chip system, where the chip system includes a processor, may further include a memory, and is configured to implement the method performed by the communication apparatus in the second aspect to the sixth aspect. In a possible implementation, the chip system further includes a memory, configured to store program instructions and/or data. The chip system may include a chip, or include a chip and another discrete device.

According to an eighth aspect, an embodiment of the present disclosure provides a communication system, where the communication system includes a plurality of communication apparatuses provided in the second aspect.

According to a ninth aspect, the present disclosure provides a computer-readable storage medium. The computer-readable storage medium stores a computer program (which may also be referred to as a code or instructions), and when the computer program is run, a computer is enabled to perform the method in any possible implementation of the first aspect.

According to a tenth aspect, a computer program product is provided. The computer program product includes a computer program (which may also be referred to as a code or instructions), and when the computer program is run, a computer is enabled to perform the method in any possible implementation of the first aspect.

For beneficial effects of the second aspect to the tenth aspect and the implementations of the second aspect to the fourth aspect, refer to descriptions of beneficial effects of the method in the first aspect and the implementations of the first aspect.

In the embodiments of the present disclosure, a receiving side of the network device may process a bit error result to be sent to a transmit side of the network device, or a transmit side of the network device processes a received bit error result, so that a quantity of bit errors that is indicated by a bit error result to be sent by the transmit side of the network device does not exceed 8 or 16. In this way, the bit error result can be indicated by using the REI that occupies 4 bits, and even if a quantity of bit errors that is indicated by the bit error result counted inside the network device exceeds 8 or 16, it can be ensured that each device in a network works normally.

BRIEF DESCRIPTION OF DRAWINGS

FIG. 6 is a schematic diagram of a structure of an O code;

DESCRIPTION OF EMBODIMENTS

The following clearly and completely describes the technical solutions in embodiments of the present invention with reference to the accompanying drawings in embodiments of the present invention.

For ease of understanding by a person skilled in the art, before the present disclosure is described, some terms in embodiments of the present disclosure are first briefly explained and described.

FlexE is a general technology that supports a plurality of Ethernet media access control (MAC) rates. In FlexE, a concept of a flexible Ethernet bonding group (which may also be referred to as a FlexE group or briefly referred to as a bonding group) is introduced. The bonding group may be obtained by bonding a plurality of physical layer apparatuses (which may also be considered as physical link interfaces, and may be denoted as PHY). A bandwidth resource corresponding to one bonding group is a sum of bandwidth resources corresponding to PHYs in the bonding group. Therefore, FlexE can meet a larger transmission rate and a larger transmission bandwidth based on the bonding group.

Figure 1:
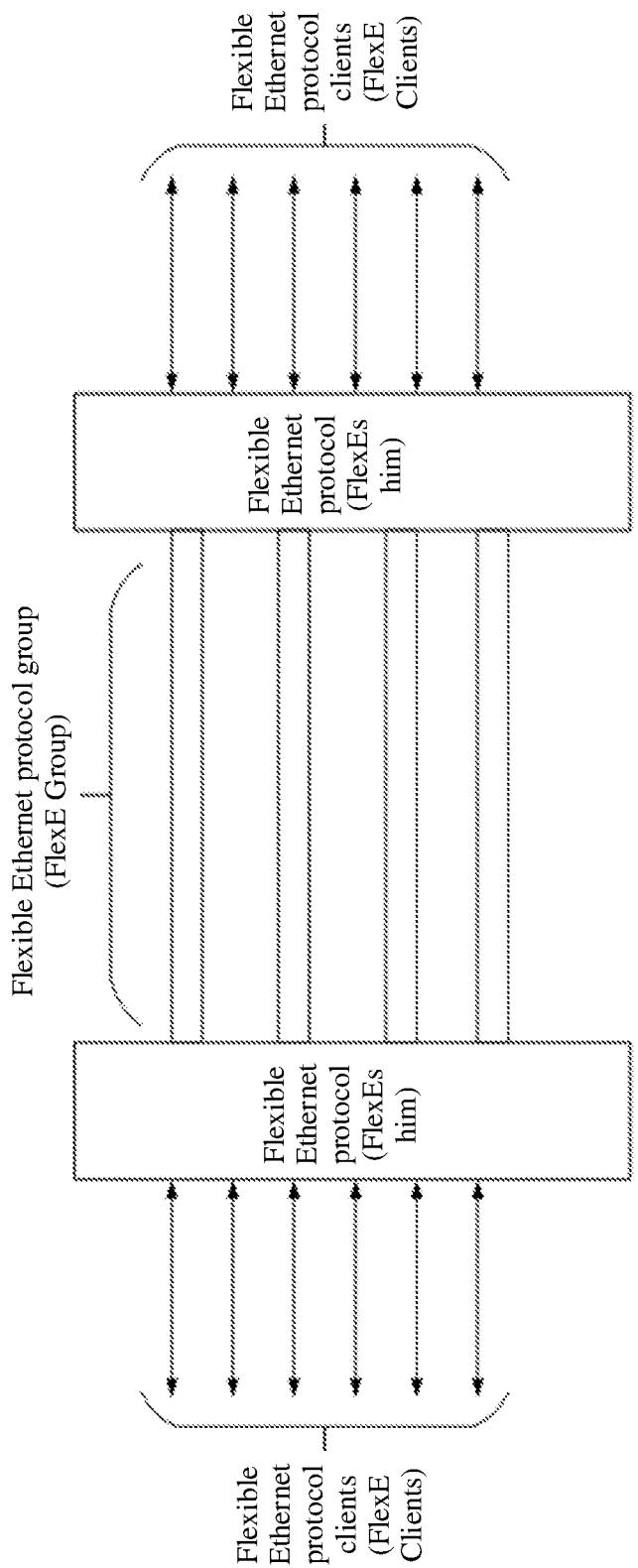
FIG. 1 is a schematic diagram of a communication system based on the flexible Ethernet protocol.

FIG. 1 is an example schematic diagram of a communication system based on the flexible Ethernet protocol. In FIG. 1, an example in which one bonding group includes four PHYs is used. In FlexE, a bandwidth resource of each PHY is divided into a plurality of slots through time division multiplexing (TDM), to implement hard isolation of transmission pipe bandwidth. A flexible Ethernet client (FlexE Client) represents a service stream transmitted in a slot (one or more slots) specified on the FlexE group. One FlexE group may carry a plurality of FlexE clients. One FlexE client corresponds to one service stream (which may be typically referred to as a media access control (MAC) client). A flexible Ethernet protocol functional layer (which may also be referred to as a FlexE shim) provides data adaptation and conversion from the FlexE client to the MAC client.

FlexE may support functions such as bonding, a sub-rate, and channelization by bonding a plurality of PHYs. For example, FlexE bonds a plurality of 100 GE PHY ports, and divides each 100 GE port into 20 slots in time domain by using 5 G as a granularity. FlexE may support services at different Ethernet medium access control (MAC) rates. For example, a 200 G MAC service is supported in a 2×100 GE link group, that is, FlexE bonds a plurality of Ethernet ports to form one link group, to support a medium access control (MAC) service whose rate is greater than that of a single Ethernet port, that is, FlexE supports the bonding function. For another example, transmission of a 50 G MAC service is supported in a 100 GE link group, that is, a slot is allocated to a service to support a MAC service whose rate is less than the bandwidth of a link group or less than the bandwidth of a single Ethernet port, that is, FlexE supports the sub-rate function. For another example, transmission of one 150 G MAC service and two 25 G MAC services is supported in a 2×100 GE link group, that is, a slot is allocated to a service to support transmission of a plurality of MAC services in a link group, that is, FlexE supports the channelization function.

It may be learned that in FlexE, a plurality of service streams may be transmitted in parallel by using the FlexE group, and service data of a same service stream may be carried on one PHY in the FlexE group, or may be carried on different PHYs in the FlexE group. In other words, service data of a same service stream may be transmitted to a peer by using one PHY in the FlexE group, or may be transmitted to a peer by using a plurality of PHYs in the FlexE group. A bandwidth resource of one PHY is generally divided into a plurality of slots. In actual use, the service data is encapsulated in the slot, and then the slot is mapped to the PHY in the FlexE group.

Figure 2:
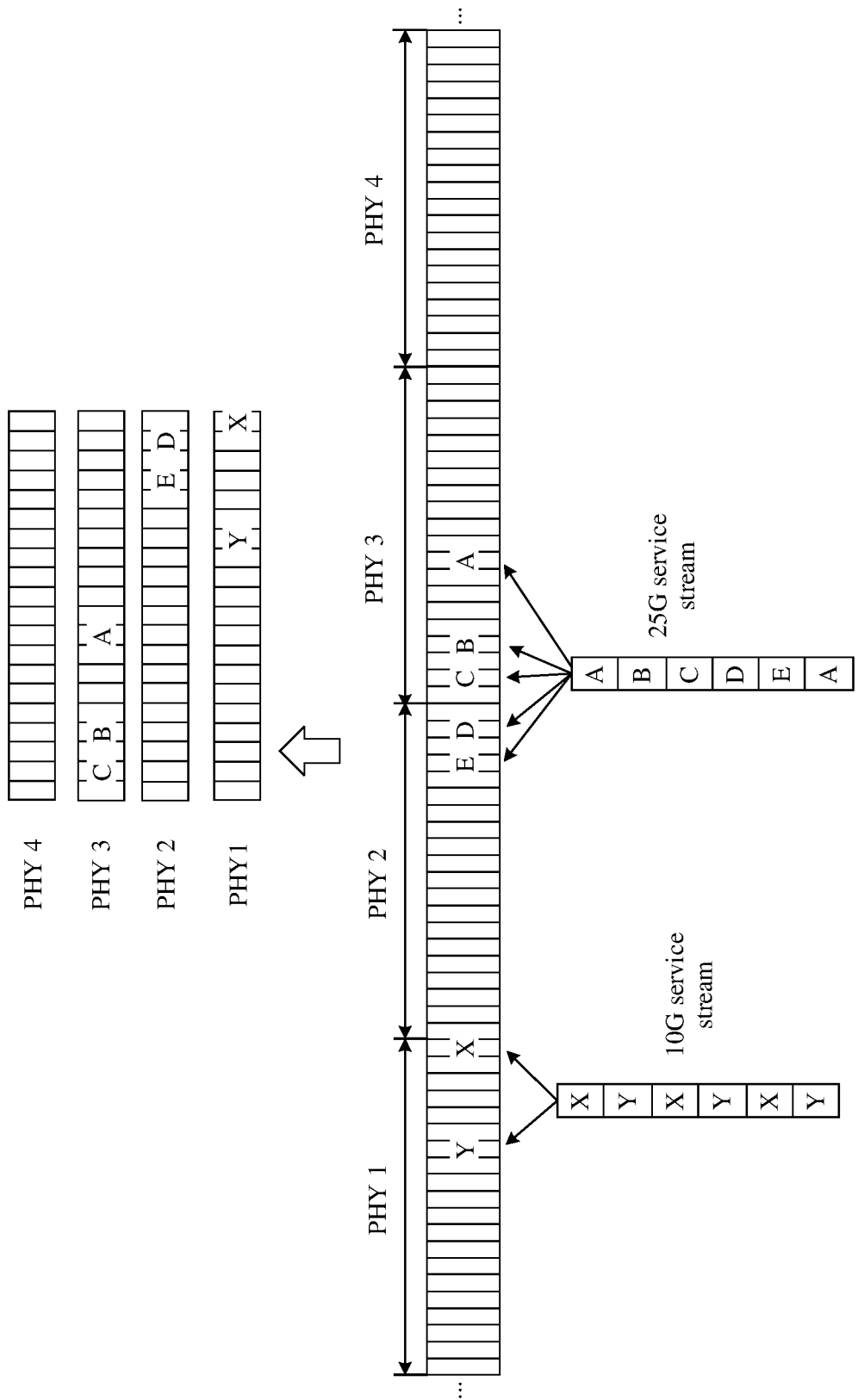
FIG. 2 is a schematic principle diagram of mapping a service stream of a FlexE client to a FlexE group.

For example, FIG. 2 is a schematic principle diagram of mapping a service stream of a FlexE client to a FlexE group. In FIG. 2, an example in which a FlexE group is obtained by bonding four 100 GE PHYs. The four PHYs are a PHY1, a PHY2, a PHY3, and a PHY4. Each PHY in the four PHYs is divided into 20 slots in time domain by using 5 G as a granularity. For example, a 10 G service stream and a 25 G service stream are transmitted by using the FlexE group. It should be understood that the 10 G service stream may be carried in two slots, and the 25 G service stream may be carried in five slots. The 10 G service stream may be carried on a plurality of PHYs in the FlexE group, or may be carried on one PHY in the FlexE group (which is used as an example in FIG. 2, for example, the 10 G service stream is carried in a slot X and a slot Y of the PHY1). Similarly, the 25 G service stream may be carried on one PHY in the FlexE group, or may be carried on a plurality of PHYs in the FlexE group (which is used as an example in FIG. 2, for example, the 25 G service stream is carried in a slot D and a slot E of the PHY2, and is carried in a slot A, a slot B, and a slot C of the PHY3).

After receiving a service stream from a transmit end, a receive end needs to recover each service stream. For example, the receive end needs to determine that data carried in the slot D and the slot E of the PHY2 and data carried in the slot A, the slot B, and the slot C of the PHY3 belong to a same service stream. This relates to parsing of received data by the receive end. To enable the receive end to correctly parse data from the transmit end, when sending a service stream, the transmit end sends an overhead code block indicating a service stream to which the data belongs.

Figure 3:
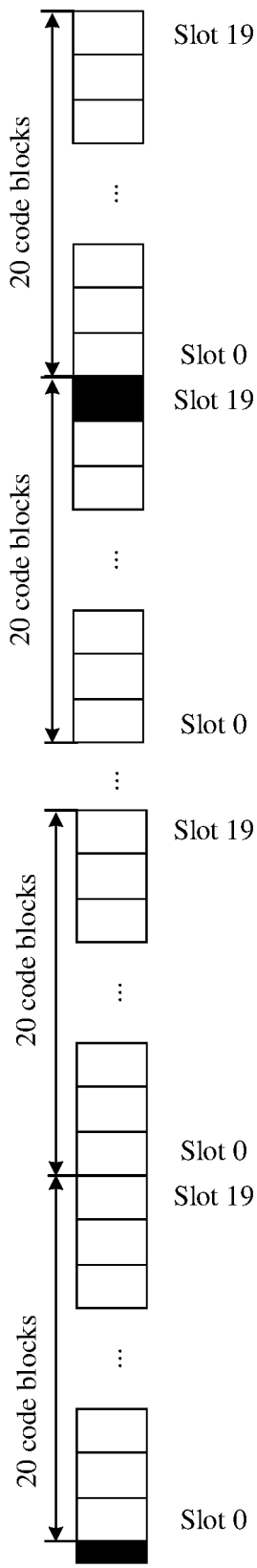
FIG. 3 is a schematic diagram of inserting an overhead code block into a service stream.

For example, FIG. 3 is a schematic diagram in which a transmit end inserts an overhead code block. In FIG. 3, a 100 G PHY interface divided into 20 slots is used as an example. When sending a service stream, the transmit end may periodically insert an overhead code block. As shown in FIG. 3, one 66B overhead code block (FlexE overhead) is inserted at an interval of 1023×20 66B payload data code blocks. In FIG. 3, the overhead code block is shown by using a black code block, and the payload data code block is shown by using a white code block.

Figure 4:
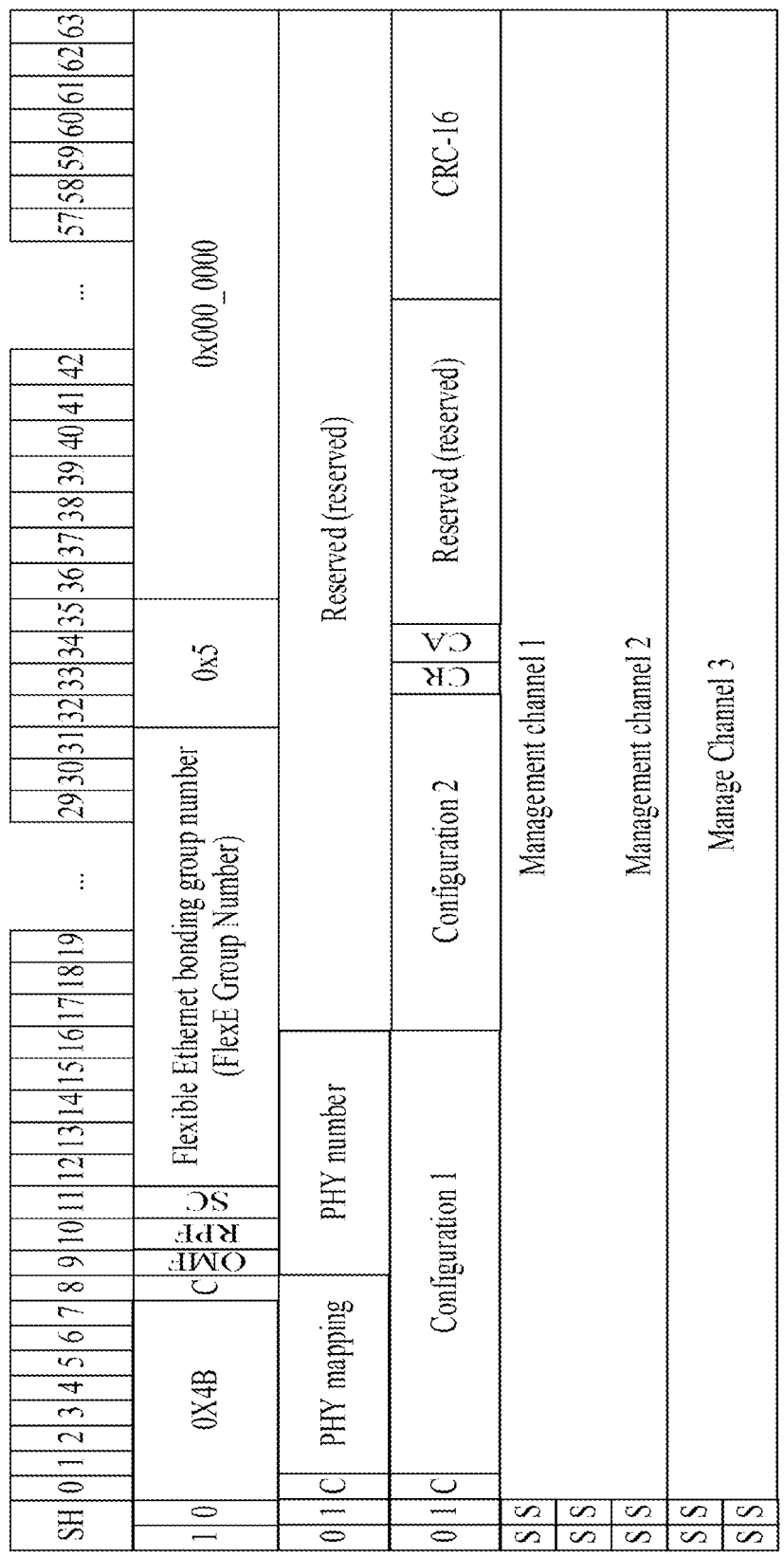
FIG. 4 is a schematic diagram of an overhead of a FlexE instance defined in OIF FlexE IA.

FIG. 4 is a schematic diagram of an overhead of a FlexE 100 G instance defined in a standard. An overhead of each FlexE 100 G instance includes eight code blocks in a 64B/66B encoding format. The code block is a code block defined in the IEEE Std 802.3-2018.IEEE Standard for Ethernet SECTION SIX. In FIG. 4, a code block numbered 8 represents calendar configuration in use, and is denoted as C. If C is 0, it indicates that a calendar A is in use. If C is 1, it indicates that a calendar B is in use. A code block numbered 9 represents an overhead multiframe indicator (OMF), and is used to indicate a location of a current frame in a multiframe. A code block numbered 10 is used to indicate whether a remote PHY fault exists, and is denoted as RPF. For example, if RPF is 1, it indicates that a fault exists. If RPF is 0, it indicates that no fault exists. A code block numbered 11 represents synchronization configuration, and is denoted as an SC. If the bit is 1, a code block numbered 6 in the overhead is used as a synchronization messaging channel. If the bit is 0, the code block numbered 6 in the overhead is used as a part of a shim-to-shim channel. CR is used to request a peer to switch calendar configuration. CA is used to send an acknowledgement to the peer, indicating that a local end is ready to switch the configuration. PHY map represents a specific FlexE instance in a bonding group. PHY number represents a serial number or a number of the FlexE instance. FlexE group number is used to indicate a number of the FlexE group. A management channel is used to transfer a management control message of a device. For example, a management channel 1 occupies two 66B code blocks, and is used to transfer a control message of a section of the device. A management channel 2 is used to transfer a control message or a synchronization message between shims. A management channel 3 occupies a plurality of 66B code blocks, and is used to transfer a control message between shims.

It may be learned that, in addition to some fields used for a specific indication, there is currently some space used as a reserved field. In addition, five 66B code blocks are provided and may be used as management channels for transmitting information other than a payload data between two FlexE devices. A service stream sent by the transmit end to the receive end may be referred to as a FlexE frame. The FlexE frame falls into a basic frame and a multiframe. A single frame includes eight rows*one column of 66B overhead code blocks and eight rows*(1023*20) columns of 66B payload code blocks, and 32 single frames constitute one multiframe. It should be understood that service data included in the service stream sent by the transmit end may be carried in a payload code block included in the multiframe. The receive end receives the multiframe, and may determine, based on the overhead code block, data that is on a specific payload code block and that belongs to a same service stream.

Figure 5:
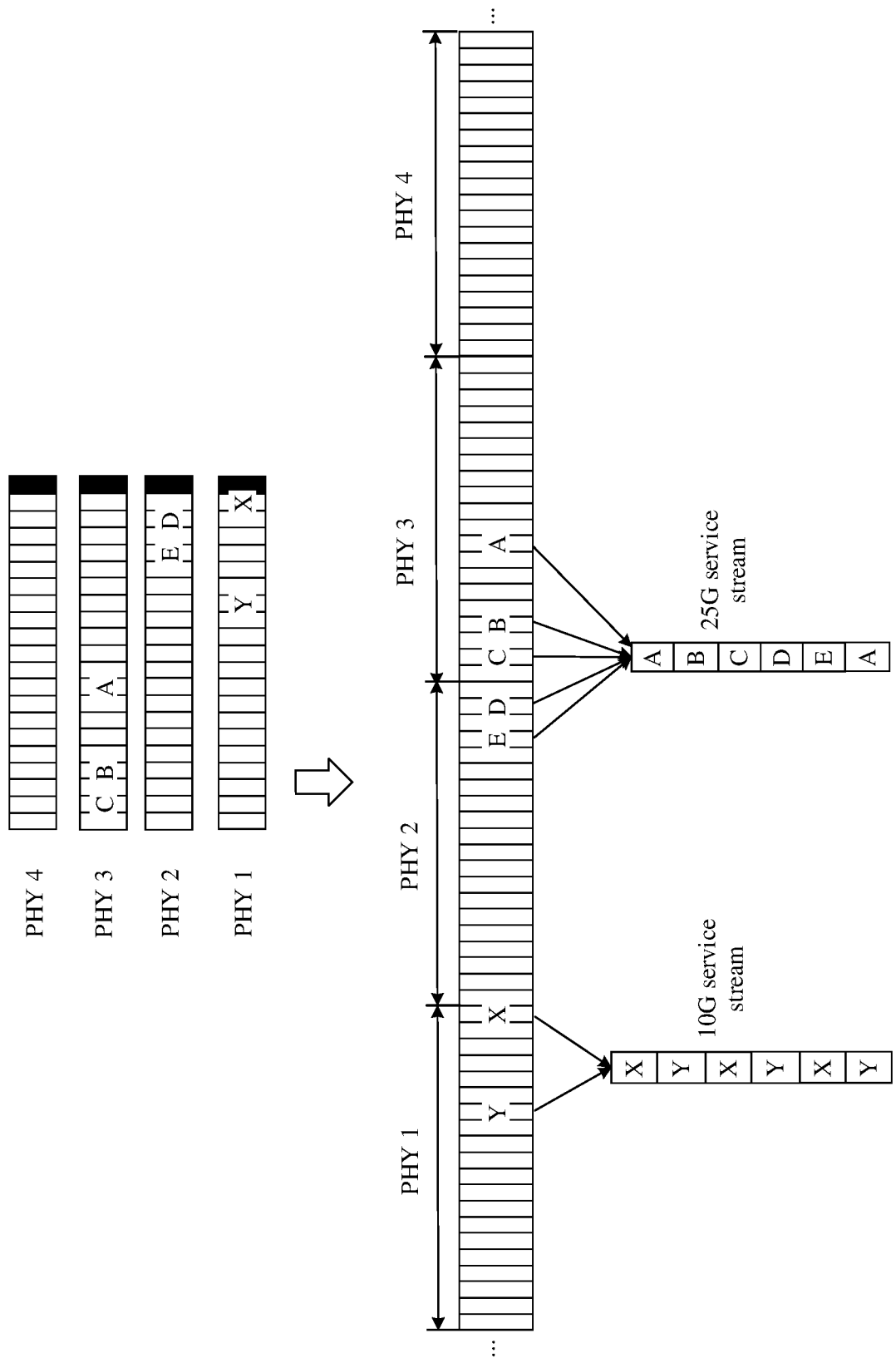
FIG. 5 is a schematic principle diagram of demapping a service stream of a FlexE client from a FlexE group.

For example, FIG. 5 is a schematic principle diagram of demapping a service stream of a FlexE client from a FlexE group. It should be understood that FIG. 5 shows an inverse process of that in FIG. 2. In FIG. 5, an overhead code block is shown by using a black code block. It should be understood that each slot corresponds to one overhead code block, indicating a service stream to which data carried in the slot belongs. The receive end correctly parses the service stream from the transmit end by using the overhead code block.

The foregoing describes some terms in the embodiments of the present disclosure, and the following describes technical features related to the embodiments of the present disclosure.

It should be understood that, when a service stream is transmitted in a transport network, an error is inevitable, that is, a bit error occurs in the service stream. To verify validity of the service stream, a current mainstream practice is to verify the service stream by using a parity-check code. Parity check falls into odd parity and even parity. Odd parity means that a signal stream obtained after a parity bit is added to an original service stream includes an odd quantity of check values (for example, "0" or "1"), while even parity means that a signal stream obtained after a parity bit is added to an original service stream includes an even quantity of check values. In other words, a quantity of "1" in the original service stream and the parity bit in odd parity is an odd number, and a quantity of "1" in the original service stream and the parity bit in even parity is an even number. When sending a service stream to a sink device, a source device may add a check value, that is, the signal stream sent by the source device to the sink device includes an original service stream and the check value. The sink device receives the signal stream from the source device, and calculates a quantity of check values (for example, "1") included in the signal stream other than a parity bit, to obtain a check value. The sink device compares the calculated check value with the check value received from the source device. If the two check values are consistent, no bit error may exist in the signal stream sent by the source device. On the contrary, if the two check values are inconsistent, a bit error may exist in the signal stream sent by the source device. To complete a complete error detection mechanism, the sink device may feed back, to the source device, a comparison result, namely, whether a bit error exists in the signal stream sent by the source device. Alternatively, the sink device may notify the source device of information such as a quantity of bit errors in the signal stream sent by the source device.

Figure 6:
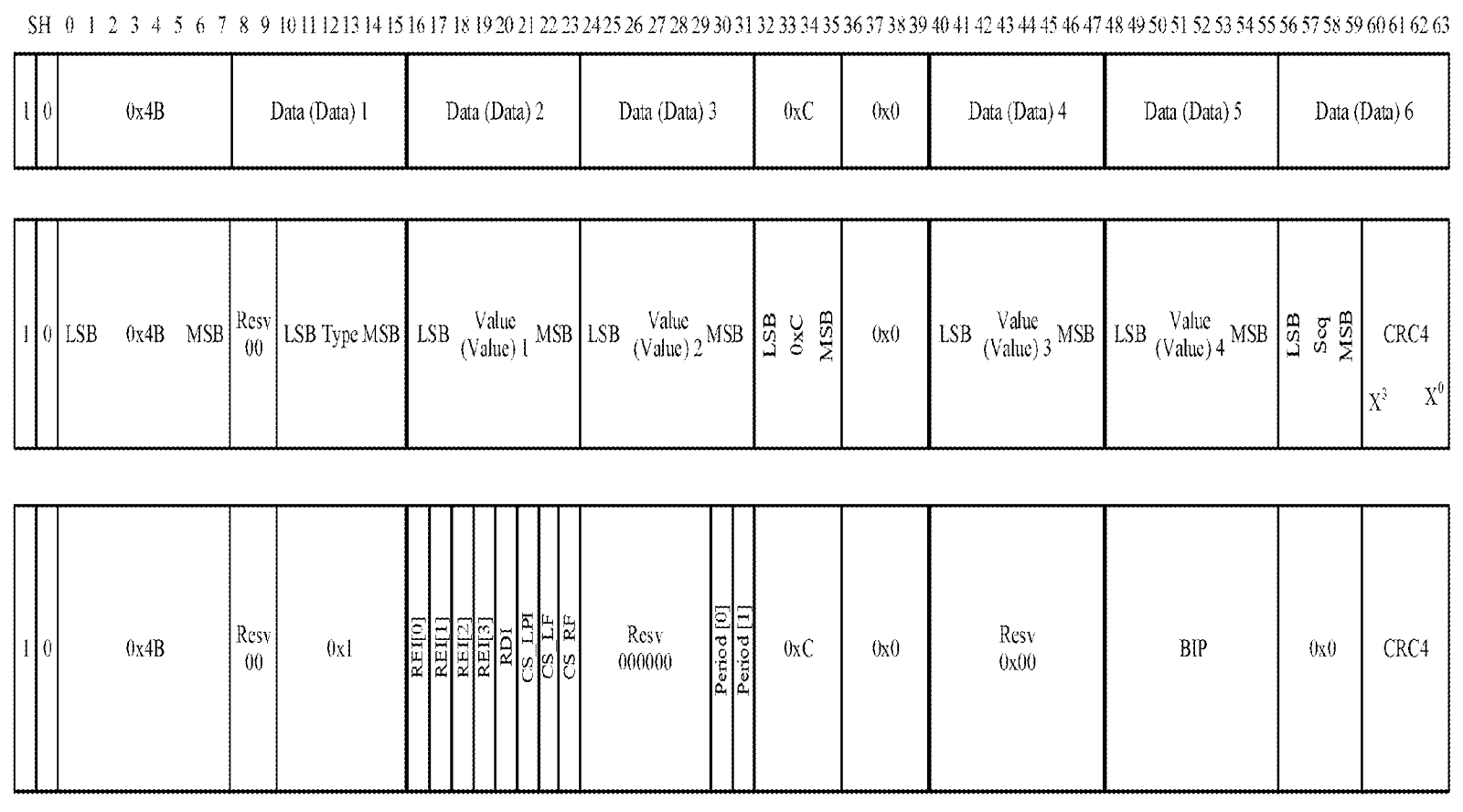

In some embodiments, check information and bit error information may be transmitted by using an O code (which may be considered as a special 64B/66B control code block), that is, the check information and the bit error information may be carried by using the O code. For example, FIG. 6 is a schematic diagram of a structure of an O code. The O code block is a 66B control code block, and occupies 66 bits. The 48$^{th}$ bit to the 55$^{th}$ bit may be used to carry check information of BIP8, and the 16$^{th}$ bit to the 19$^{th}$ bit, namely, a REI[0] to a REI[3], are used to indicate a bit error case of a locally received signal stream to a far end. Because the REI occupies 4 bits, a maximum of 16 error values (0 to 15) can be identified.

Figure 7:
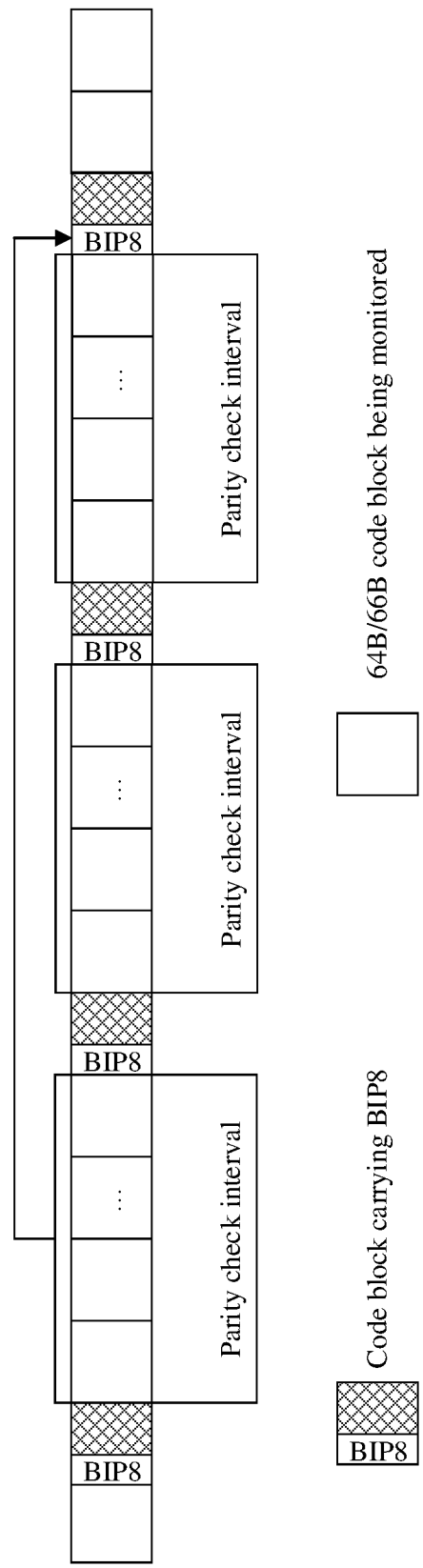
FIG. 7 is a schematic diagram of transmitting, in a network device, a signal stream carrying an O code according to an embodiment of the present disclosure.

A sending period of the O code may be configured, for example, one O code is sent per 16384 code blocks by default. For example, FIG. 7 is a schematic diagram of sending a signal stream. It should be understood that a code stream included between two O codes (code blocks carrying BIP8) is a parity-check interval (also referred to as a check interval) of BIP8, that is, BIP8 is a check result of a code stream in the parity-check interval.

Figure 8:
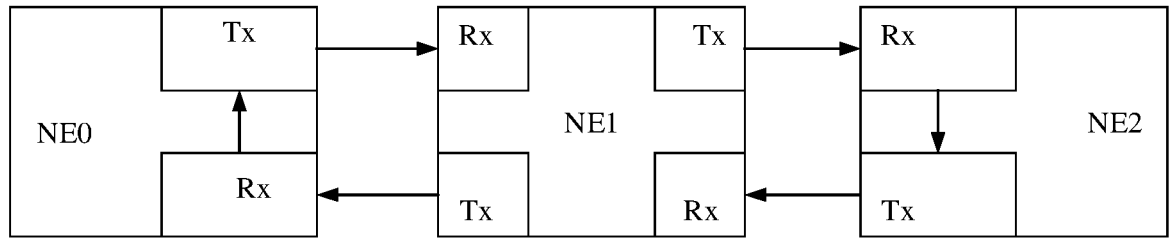
FIG. 8 is a schematic diagram of a network architecture of a communication system to which an embodiment of the present disclosure is applicable.

For ease of understanding, FIG. 8 shows a network architecture constituted by three devices. The three devices are respectively an NE0, an NE1, and an NE2. The NE0 and the NE1 may be connected to each other by using a FlexE group, and the NE1 and the NE2 may be connected to each other by using a FlexE group. It should be understood that the NE0, the NE1, and the NE2 each include a receive end (Rx) and a transmit end (Tx). The transmit end (Tx) of the NE0 may send a calculated check result (which may also be referred to as a bit error result), namely, BIP8, to the NE2 together with a signal stream by using an O code, and the receive end (Rx) of the NE2 compares the received BIP8 with a local check calculation result. For example, Tx of the NE0 sends BIP8 to the NE1 by using an O code. Rx of the NE1 receives a signal stream, and forwards the signal stream to the NE2 by using Tx. Rx of the NE2 receives the signal stream, and may extract BIP8 in the signal stream. The NE2 further calculates a check result locally, and compares the extracted BIP8 with the locally calculated check result, to determine whether a bit error exists in the signal stream sent by the NE0. For example, a value of BIP8 received by the NE2 is "01001111", and the check result locally calculated by the NE2 is "01111000". The NE2 compares "01001111" with "01111000", and finds that five bits are different. Therefore, it can be determined that there are five bit errors in a check interval. The NE2 can count a bit error result, and store the counted bit error result in a bit error counter. The NE2 may further feed back the bit error result to the NE0. For example, the NE2 reads the counted bit error result from the bit error counter, assigns the counted bit error result to the REI (for example, the REI carries "0101"), and sends the bit error result to the NE0 by using an O code. The REI in the O code carries a quantity of bit errors. In this way, after receiving the O code from the NE2, the NE0 can determine that five bit errors occur in the check interval.

Figure 9:
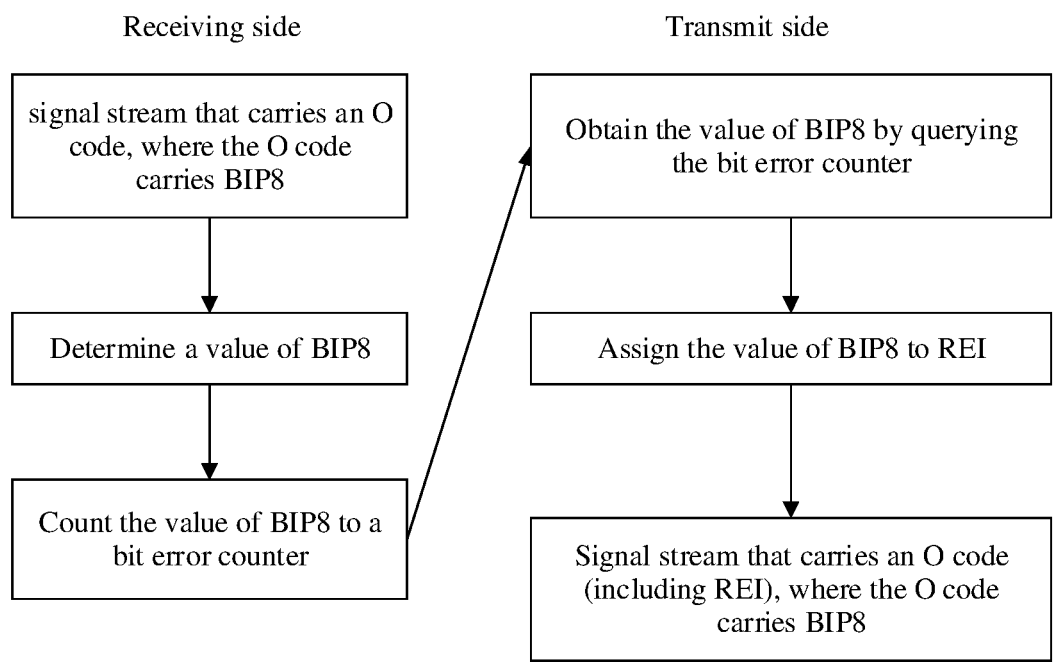
FIG. 9 is a schematic diagram of determining a quantity of bit errors included in a service stream according to an embodiment of the present disclosure.

In an alternative schematic manner, FIG. 9 is a schematic flowchart of determining a quantity of bit errors included in a service stream. It should be understood that a receiving side of a network device receives, from a previous node device, a signal stream (receives an O code) that carries an O code, and the O code carries BIP8. The receiving side of the network device parses the O code, determines a value of BIP8 (BIP check), and stores the value of BIP8 to a bit error counter. A transmit side of the network device may send, to a next node device, a signal stream (send an O code) that carries an O code. The O code carries the value of BIP, and the value of BIP is carried in a REI in the O code, that is, before sending the O code, the transmit side assigns the value of BIP8 to the REI. It should be understood that the value of BIP8 is obtained by querying the bit error counter. In other words, before sending the O code, the transmit side of the network device may query the bit error counter to obtain a counted bit error result, and then send the signal stream that carries the O code.

Because transmission is performed based on an Ethernet underlying protocol stack and an Ethernet optical module in FlexE, a frequency offset exists between any two ports on a transmission link. Consequently, when a source device sends one check code, a sink device may receive a plurality of check codes, causing an error in a counted bit error result. Still referring to FIG. 8, for example, −100 ppm exists between two ports (a transmit end and a receive end) of the NE0, and a frequency offset between two ports of each of the NE1 and the NE2 is +100 ppm. It is assumed that a transmission rate of an MTN path is 10 Gbps, and a sending period of an O code that carries BIP8 is 16384 code blocks. The NE0 is used as an example. Each time the transmit end of the NE0 sends an O code, a quantity of O codes received by the receive end of the NE0 is (10 Gbps*200 ppm/64 bit/16384=1.907), that is, the NE0 receives two O codes. Similarly, if the transmission rate of the MTN path is 15 Gbps, for the NE0, each time the transmit end sends an O code, the receive end receives eight O codes.

Figure 10:
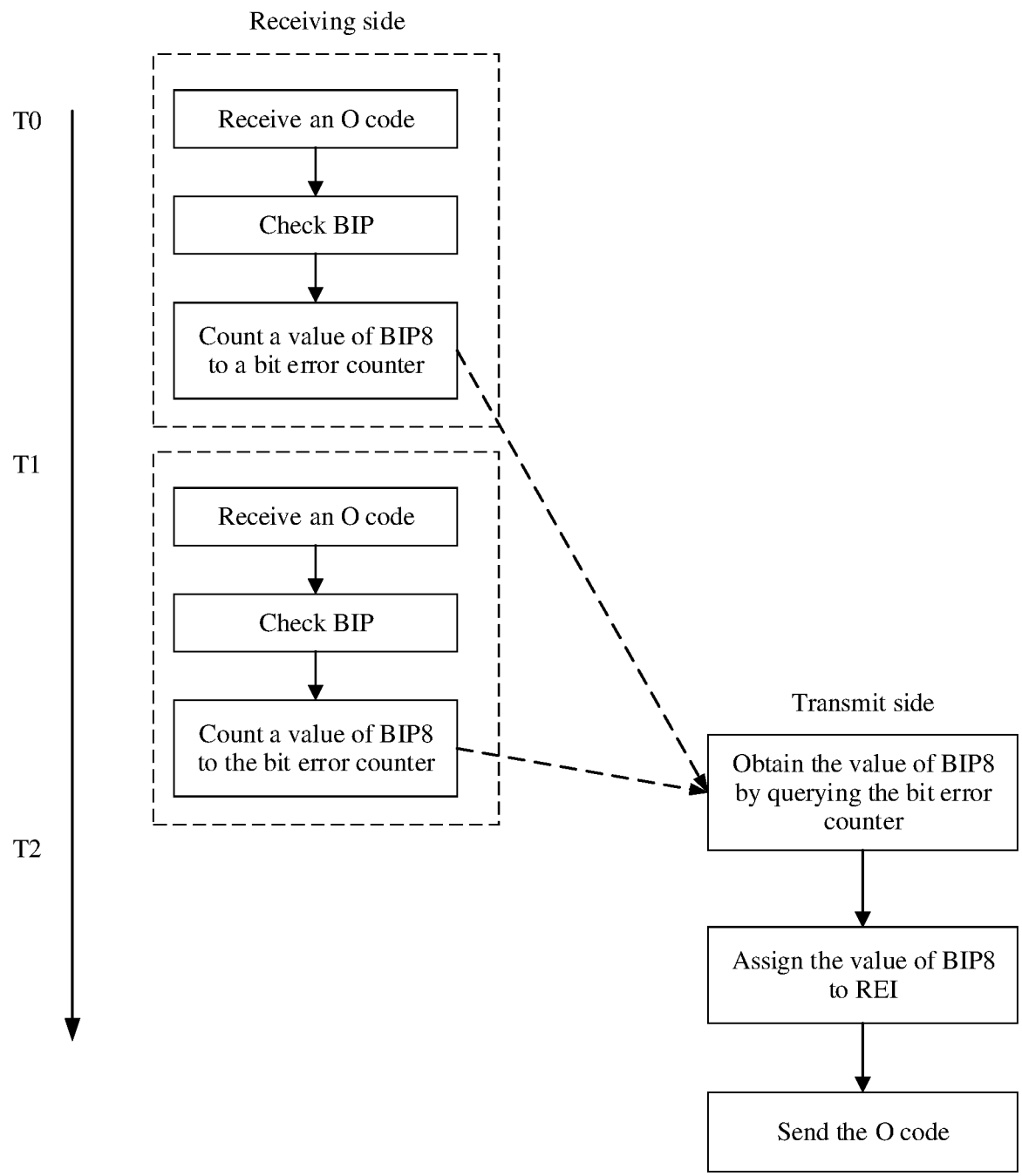
FIG. 10 is a schematic principle diagram in which a bit error result exceeds 8 due to a frequency offset according to an embodiment of the present disclosure.

For ease of understanding, the NE0 is used as an example, and FIG. 10 is a schematic principle diagram in which a bit error result obtained after accumulation exceeds 8 due to a frequency offset. The receiving side of the NE0 receives the first O code at a moment T0, calculates a bit error result, namely, a value of BIP8, of a check interval based on BIP8 information carried in the O code, and stores the bit error result to a bit error counter. Due to a frequency offset, the transmit side of the NE0 does not send the O code at T0 or before a next O code arrives (before a moment T1). At the moment T1, the receiving side of the NE0 receives the second O code, calculates a bit error result of the check interval based on BIP8 information carried in the O code, and stores the bit error result to the bit error counter. It should be understood that a bit error result counted each time indicates that a quantity of bit errors does not exceed 8. However, before the moment T1, the first O code is not sent, and the receiving side of the NE0 finally stores the bit error result to the bit error counter. In this case, bit error results counted a plurality of times may be accumulated, and consequently a value of the bit error counter exceeds 8 or even exceeds 16. However, the REI has only 4 bits, and can represent a maximum of 15 bit errors. As a result, the bit error result may not be accurately indicated by using the REI that occupies 4 bits. If there are more than eight bit errors, different operators of the network device select different processing manners, for example, some network devices alarm, some network devices may suspend running, and consequently the entire network cannot work normally.

In view of this, the embodiments of the present disclosure provide a bit error indication method for a service stream. In the method, a receiving side of a network device may process a bit error result to be sent to a transmit side of the network device, or a transmit side of a network device processes a received bit error result, so that a quantity of bit errors that is indicated by a bit error result to be sent by the transmit side of the network device does not exceed 8 or 16. In this way, the bit error result can be indicated by using a REI that occupies 4 bits, and even if a quantity of bit errors that is indicated by a bit error result counted inside the network device exceeds 8 or 16, it can be ensured that each device in a network works normally.

The technical solutions provided in the embodiments of the present disclosure may be applied to a flexible Ethernet, and may be further applied to another type of network such as a metro transport network (MTN). The MTN is a new generation transport network technology system defined by ITU-T for a new service requirement such as 5G on the basis of FlexE logic. The MTN is a new generation transport network technology system defined by ITU-T for a new service requirement such as 5G on the basis of FlexE logic. From the perspective of protocol stack, roughly, an MTN section layer is similar to an OIF FlexE shim in terms of function. A current version of the MTN section layer reuses and is compatible with FlexE. A frame format of the current version of the MTN section layer retains a FlexE frame format. Because the frame format of the MTN section layer retains the FlexE frame format, the MTN is similar to FlexE. If a bit error result is greater than 8 or 16, the bit error result cannot be correctly indicated by using the 4-bit REI.

Figure 11:
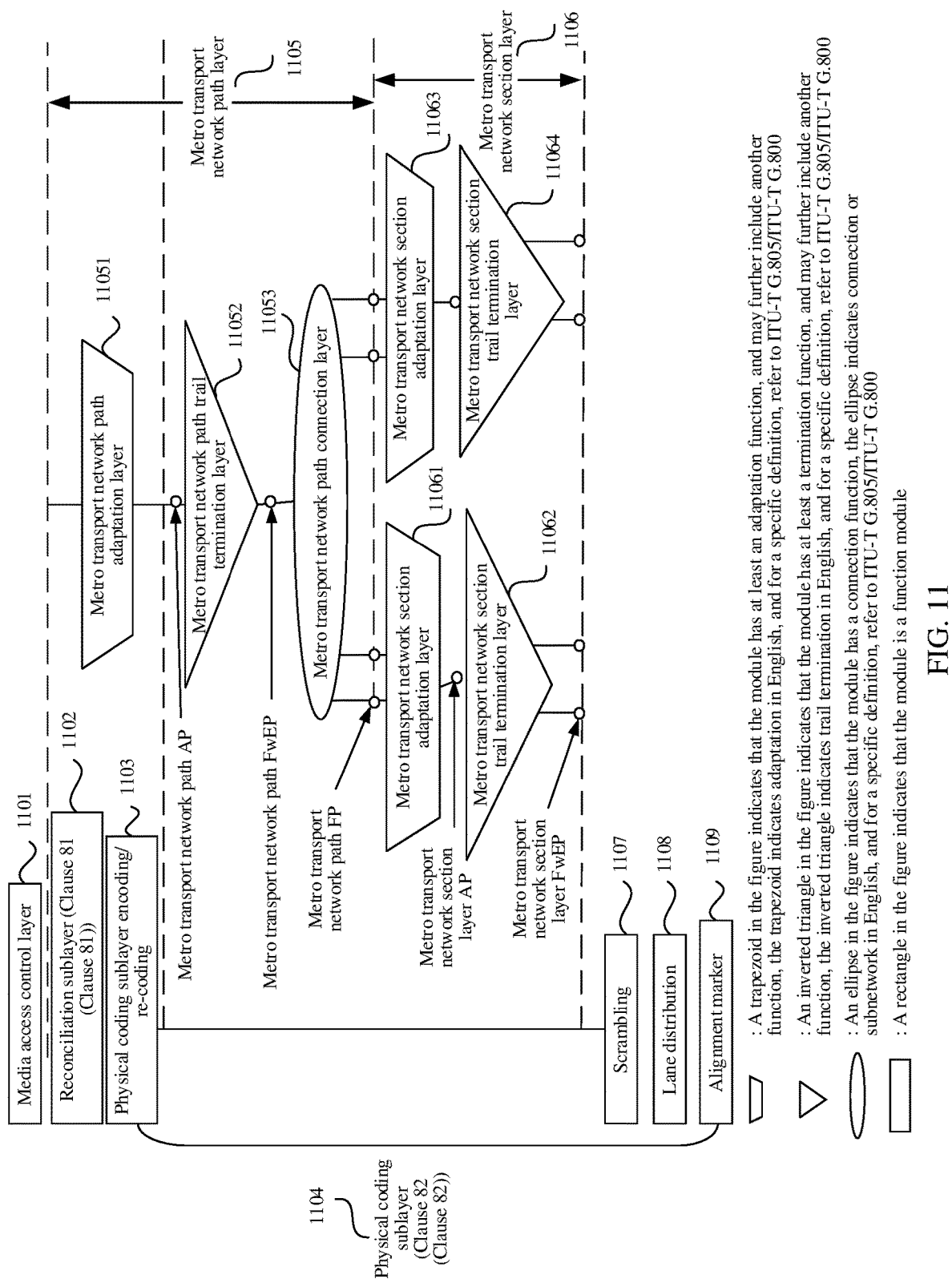
FIG. 11 is a schematic diagram of a new transport network layered network formed by an MTN section layer and an MTN path layer.

FIG. 11 shows a new transport network layered network formed by an MTN path layer 1105 and an MTN section layer 1106. The MTN path layer 1105 includes an MTN path adaptation functional module 11051, an MTN path trail termination functional module 11052, an MTN path connection functional module 11053, and the like. The MTN section layer 1106 includes an MTN section adaptation functional module and an MTN section trail termination functional module. For example, the MTN section layer 1106 may include an MTN section adaptation functional module 11061 and an MTN section trail termination functional module 11062, or the MTN section layer 1106 may include an MTN section adaptation functional module 11063 and an MTN section trail termination functional module 11064.

When a node is configured to send data, as shown in FIG. 11, a signal stream received by the node successively passes through MAC 1101 and RS 1102 to enter the MTN-domain MTN path adaptation functional module 11051. After a PCS encode/decode module (the PCS encode/decode module 1103 is configured to perform encoding in a data sending process) performs encoding, a client signal is in a form of a 64B/66B code block stream. After the 64B/66B code block stream enters the MTN path trail termination functional module 11052, overhead information such as path-layer OAM is inserted into the code stream, and a corresponding forwarding port and slot are found by the MTN path connection functional module 11053. Then, the code stream enters the MTN section adaptation functional module 11061, and the code stream is interleaved with another code stream through rate adaptation. Overhead information such as section-layer OAM is inserted into the interleaved code stream in the MTN section trail termination functional module 11062, and then the code stream enters a PHY lower layer for transmission through adaptation. After adaptation, transcoding from 64B/66B to 256B/2511B is performed on the code stream. The transcoded code stream is sent to a physical link for transmission.

In a sending process, the MTN path layer 1105 may include a plurality of MTN path clients, and the MTN path client is used to perform adaptation on a client signal. The MTN path trail termination functional module 11052 is configured to add some overhead information to the client signal, where the overhead information may include operation, administration and maintenance (OAM) information. The MTN path connection functional module 11053 is configured to: find corresponding forwarding information for forwarding of each code stream, and find a correspondence between an egress port and an ingress port in the module, to find an egress port. The MTN path connection functional module 11053 is connected to one or more egress ports, and each egress port correspondingly outputs a plurality of MAC code block streams. FIG. 11 shows two egress ports. Each egress port outputs a plurality of MAC code block streams. A plurality of MAC code block streams output from one egress port enters the MTN section adaptation functional module 11061, and a plurality of MAC code block streams output from the other egress port enters the MTN section adaptation functional module 11063.

The MTN section adaptation functional module 11061 is configured to perform adaptation from the MTN path layer to the MTN section layer, and perform interleaving on a received code block stream. Herein, all MAC code block streams are interleaved into one code block stream. The MTN section trail termination functional module 11062 is further configured to add second overhead information to the interleaved code block stream. The second overhead information in this embodiment may include section-layer OAM and other function overhead information. A scramble module 1107 is configured to scramble the interleaved code block stream. Then, after lane distribution and alignment marker (AM) insertion functions are performed, encoding format conversion (for example, a 64B/66B code block stream is converted into a 256B/257B code block stream) is performed through forward error correction (FEC), and FEC encoding or decoding and error correction are performed on the code block stream whose format is converted. The foregoing may be alternatively described as follows: A sending direction is sending a code block stream to a lower layer after FEC encoding, and a receiving direction is sending a code block stream to an upper layer after FEC decoding and error correction. It should be understood that the MTN section adaptation functional module 11063 and the MTN section adaptation functional module 11061 perform similar processing.

On the contrary, if the node is configured to receive a signal stream, a flow direction of the signal stream received by the node is opposite to a flow direction of the signal stream sent above. For example, the signal stream received by the node successively passes through, for example, the MTN section layer 1106, the MTN path layer 1105, and the like. It should be understood that, in a receiving process, encoding format conversion (for example, a 256B/257B code block stream is converted into a 64B/66B code block stream) is first performed on the signal stream. Then, the code stream enters the MTN section layer. After the section layer performs processing and de-interleaving, the code stream is recovered to each single MAC 64B/66B code block stream in the MTN section adaptation functional module 11063. Then, each 64B/66B code block stream is forwarded in the MTN path connection functional module 11053. Details are not described herein. In addition, it should be noted that this embodiment may also be applied to an Ethernet, an optical transport network (OTN), a synchronous digital hierarchy (SDH) network, a network that has a FlexE feature and that allows a data unit to be added to or deleted from a service signal stream in a transmission process, or the like. For ease of description, this embodiment is mainly described by using the flexible Ethernet as an example.

Figure 12A:
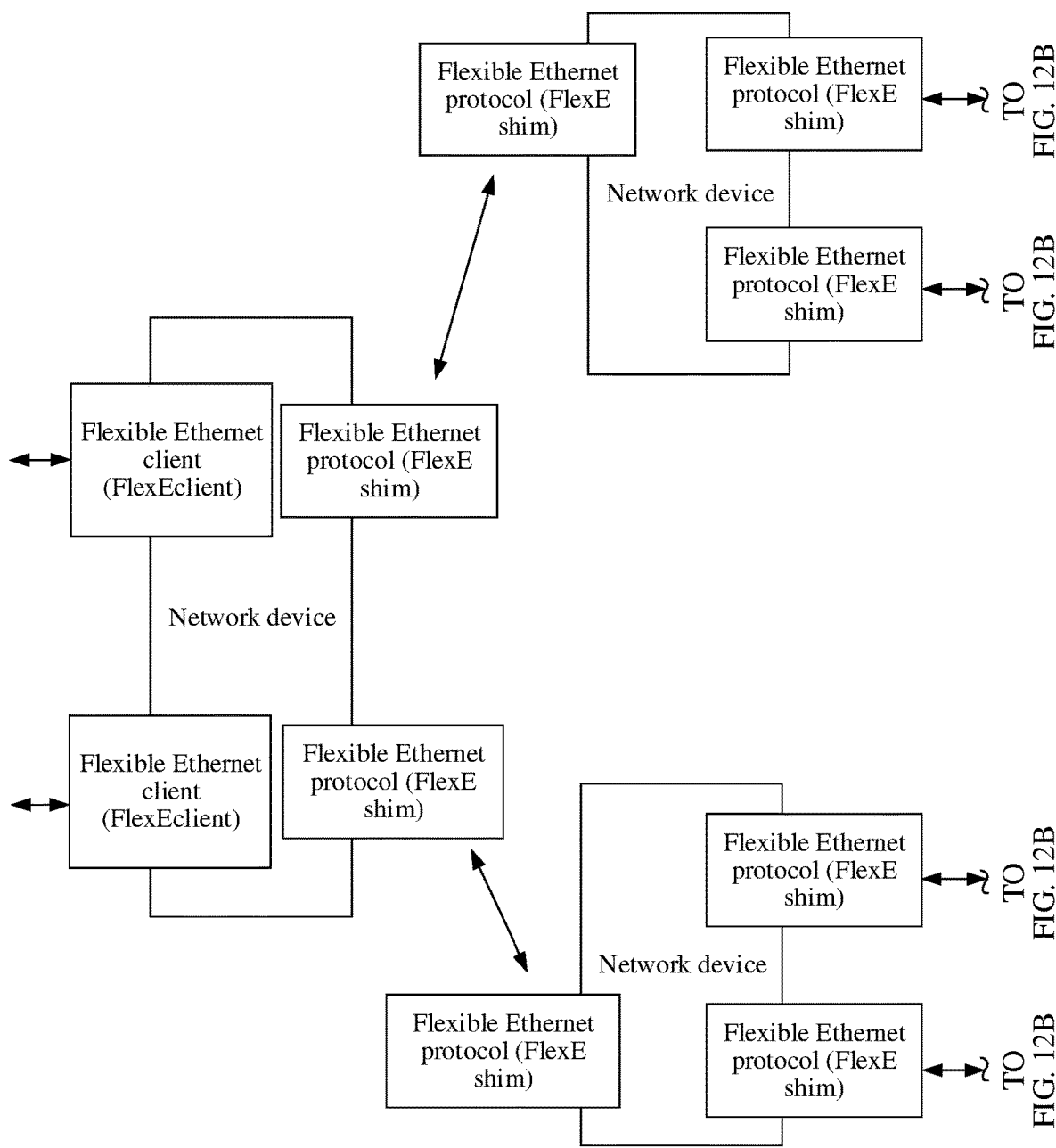
FIG. 12A and FIG. 12B are an example schematic flowchart of an architecture of a communication system to which an embodiment of the present disclosure is applicable.
Figure 12B:
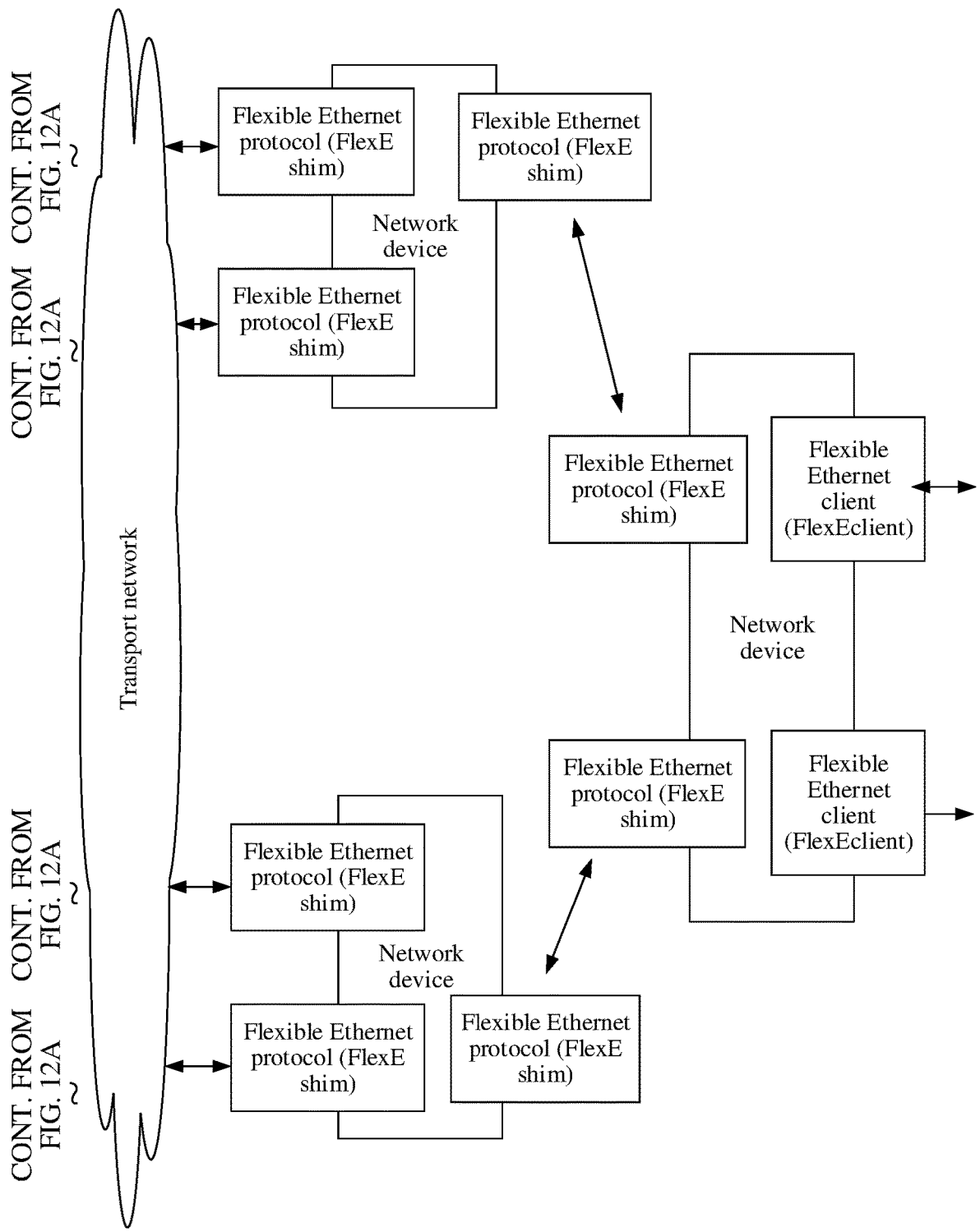

FIG. 12A and FIG. 12B are an example schematic diagram of an architecture of a communication system to which an embodiment of the present disclosure is applicable. As shown in FIG. 12A and FIG. 12B, a transmission link between a transmit end (which may also be referred to as a FlexE client) and a receive end (a FlexE client) may include a plurality of network devices (which may also be referred to as nodes), and the FlexE client performs transmission by using a network based on a FlexE interface. As shown in FIG. 12A and FIG. 12B, the network device may provide a FlexE interface. The FlexE interface may be implemented by using a FlexE shim. A FlexE interface implemented by two network devices by using a FlexE shim may be considered as a FlexE group. The network device may be a switch, a router, a packet transport network (PTN), an agile transport network (ATN), a slicing packet network (SPN), or the like. It should be understood that the transmission link between the transmit end and the receive end includes a plurality of network devices, and there is a plurality of FlexE groups. It should be noted that, in FIG. 12A and FIG. 12B, only six network devices are used as an example. In practice, more or fewer network devices may be included between the transmit end and the receive end.

Figure 13:
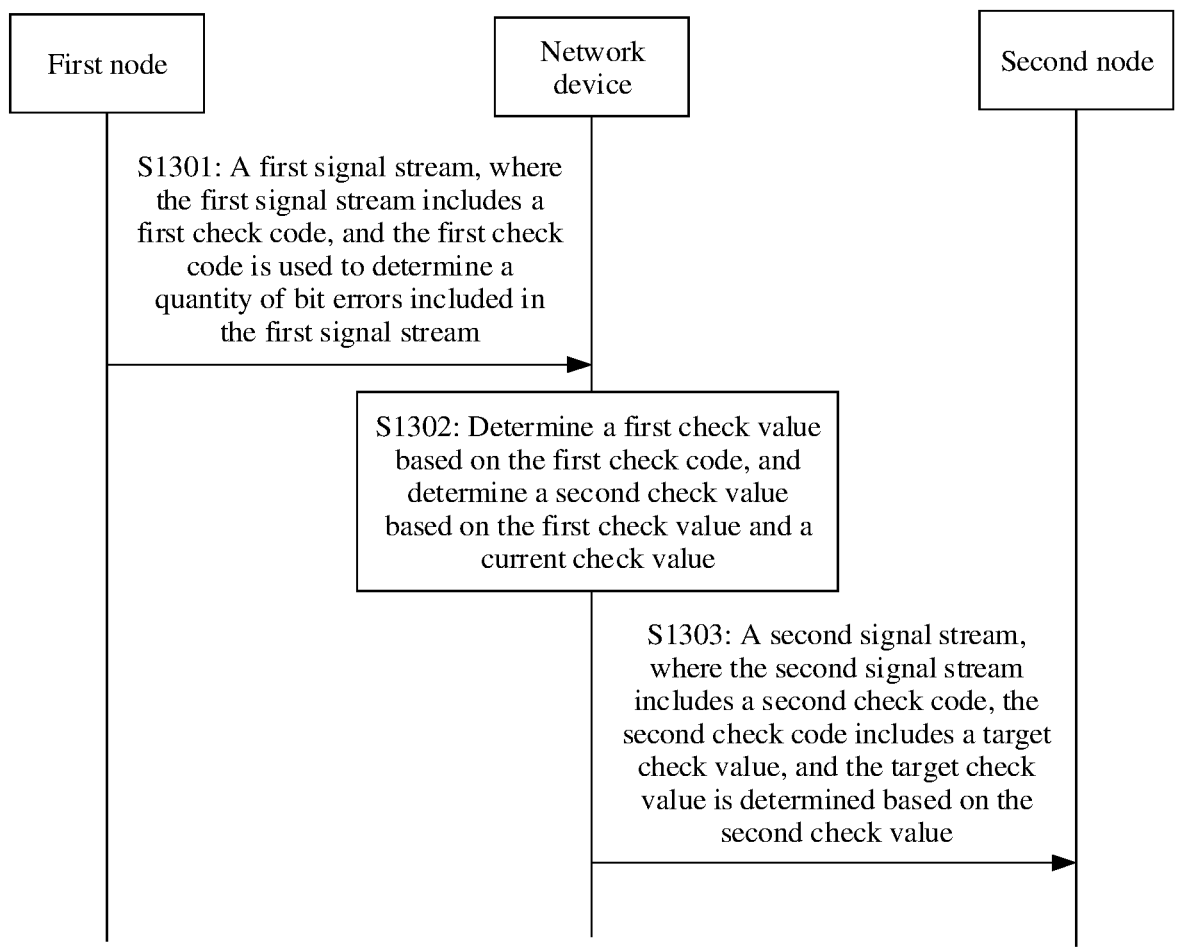
FIG. 13 is a schematic flowchart of a bit error indication method for a service stream according to an embodiment of the present disclosure.

FIG. 13 is a flowchart of a bit error indication method for a service stream according to an embodiment of the present disclosure. The bit error indication method for a service stream may be applied to the communication systems shown in FIG. 11, FIG. 12A, and FIG. 12B. The bit error indication method for a service stream may be performed by the network device in FIG. 11, or FIG. 12A and FIG. 12B, and relates to interaction of a signal stream between a transmit side and a receiving side of the network device.

Specifically, a process of the bit error indication method for a service stream provided in this embodiment is described as follows:

S1301. A network device receives a first signal stream from a first node by using N slots of a first bonding group, where the first signal stream includes a first check code, and the first check code is used to determine a quantity of bit errors included in the first signal stream.

In this embodiment, the signal stream is transmitted in the transport network shown in FIG. 11, or FIG. 12A and FIG. 12B. FIG. 12A and FIG. 12B are used as an example. For example, the signal stream is transmitted from a first network device to a second network device, and then is transmitted from the second network device to a third network device. Because the signal stream is from the first network device to the second network device and then to the third network device, the first network device may be considered as an upper-level node of the second network device, and the third network device is a lower-level node of the second network device. For ease of description, in the following, the first network device is referred to as a first node, the second network device is referred to as a network device, the third network device is referred to as a second node, and a signal stream sent by the first node to the network device is referred to as a first signal stream. It should be understood that the first node sends the first signal stream to the network device by using the first bonding group between the first node and the network device. The first bonding group includes P physical layer (PHY) links, and a bandwidth resource of each PHY link is divided into Q slots. In this case, a bandwidth resource of the first bonding group is divided into P*Q slots. The first node may send the first signal stream to the network device by using the N slots of the first bonding group, where N, P, and Q are all integers greater than or equal to 1, and N is less than or equal to P*Q.

In a transmission process, an error may occur in the first signal stream, that is, a bit error exists in the first signal stream. To enable the network device to determine whether a bit error exists in the first signal stream, or determine a quantity of bit errors included in the first signal stream, the first signal stream sent by the first node to the network device may carry the first check code, and the first check code may be used to carry a quantity of bit errors. For example, the first check code may be the O code shown in FIG. 6, and a BIP field of the O code may be used to carry the quantity of bit errors. In some embodiments, the quantity of bit errors carried in the BIP field may also be referred to as a bit error check value. In the following, the bit error check value carried in the BIP field of the O code in the first signal stream is referred to as a first check value. The network device receives the first signal stream, and may determine the first check value based on the BIP field of the O code.

S1302. The network device determines the first check value based on the first check code, and determines a to-be-stored second check value based on the first check value and a current check value.

S1303. The network device sends a second signal stream to a second node, where the second signal stream includes a second check code, the second check code includes a target check value, and the target check value is determined based on the second check value.

In some embodiments, after determining the first check value, the network device may store the first check value. Before sending the second signal stream to the second node, the network device may query a stored check value, that is, query a bit error result, assign the bit error result to a REI, and send a check code that carries the REI. In an example, after determining the first check value, the network device may store the first check value in a bit error counter. Before sending the second signal stream to the second node, the network device may query the bit error counter, and assign a check value stored in the bit error counter to the REI included in the check code carried in the second signal stream. It should be noted that the bit error counter is merely an example herein. In this embodiment, a name and a location of a container for storing a check value are not limited, provided that the network device can obtain the check value before sending the second signal stream. An example in which the check value is stored in the bit error counter is used below.

Because a frequency offset may exist between a receive end and a transmit end of the network device, before the network device sends the bit error result, the network device may have received a next check code (O code), that is, may have counted a next bit error result. In this case, a plurality of accumulated bit error results may exceed 8, or even exceed 16. As a result, the bit error result cannot be accurately indicated by using the REI that occupies 4 bits. If there are more than eight bit errors, different operators of the network device select different processing manners, for example, some network devices alarm, some network devices may suspend running, and consequently the entire network cannot work normally.

Therefore, this embodiment aims to ensure that a quantity of bit errors that is indicated by a bit error result to be sent by the network device does not exceed 8 or 16. In this way, the bit error result can be indicated by using the REI that occupies 4 bits, and even if a quantity of bit errors that is indicated by a bit error result counted inside the network device exceeds 8 or 16, it can be ensured that each device in a network works normally.

In a possible implementation, after obtaining the first check value, the network device may determine a check value (referred to as the second check value below) that needs to be stored in the bit error counter, so that a quantity of bit errors does not exceed 8 or 16. The second signal stream sent by the network device to the second node may carry the second check value obtained from the bit error counter. Even if a quantity of bit errors that is counted inside the network device exceeds 8 or 16, it can be ensured that a quantity of bit errors that is sent by the network device to the second node does not exceed 8 or 16, and the bit error result can be accurately indicated by using the 4-bit REI.

In another possible implementation, before sending the second signal stream, the network device may process the second check value obtained from the bit error counter to obtain the target check value, so that a quantity of bit errors that is indicated by the target check value does not exceed 8 or 16. This can also ensure that a quantity of bit errors that is sent by the network device to the second node does not exceed 8 or 16, and the bit error result can be accurately indicated by using the 4-bit REI.

The following describes several possible implementation solutions in which the quantity of bit errors that is indicated by the bit error result does not exceed 8 or 16. In the following, an example in which the first check code carried in the first signal stream is a first O code and the second check code carried in the second signal stream is a second O code is used. It should be understood that a BIP field included in the first O code carries the first check value, and a REI included in the second O code carries the target check value. In the following, a check value determined by the network device based on the first signal stream is referred to as the first check value, and a check value that needs to be stored by the network device in the bit error counter is referred to as the second check value. The current check value may be considered as a current value of the bit error counter, that is, a check value that is stored by the network device in the bit error counter before receiving the first signal stream. The network device determines the to-be-stored second check value, that is, updates the current check value by using the second check value. It should be understood that, before the network device sends the second signal stream to the second node, a manner in which the network device sends the second signal stream to the second node varies with a manner of processing the bit error result to be stored in the bit error counter. The target check value also varies with a magnitude of the second check value to be stored in the bit error counter. The following separately describes several possible implementations.

Solution 1: Before sending the second signal stream, the network device may accumulate a plurality of bit error results, and determine, based on a result obtained through accumulation, the second check value to be stored in the bit error counter.

For example, after receiving the first signal stream, the network device may obtain a BIP8 check value (namely, the first check value) carried in the BIP8 field included in the first O code carried in the first signal stream, and accumulate the first check value and a previous bit error result. To be specific, the network device obtains a locally calculated BIP8 check value, that is, obtains a current value of the bit error counter, and performs a summation operation on the current value and the first check value to obtain a third check value. It should be understood that the third check value may indicate a quantity of bit errors in a check interval.

Because the third check value is a result obtained through accumulation, the third check value may be greater than 8 or 16, or may be less than or equal to 8 or 16. If the third check value is directly stored in the bit error counter, when the third check value is greater than 8 or 16, apparently, the bit error result cannot be accurately indicated by using the REI that occupies 4 bits. In this embodiment, the network device may determine, based on a magnitude of the third check value, the second check value that needs to be stored in the bit error counter, to ensure that the second check value is less than or equal to 8 or 16. For example, the network device may determine whether the third check value is greater than a preset threshold N (for example, 8 or 16, where N=8 is used as an example below), and determine a value of the bit error counter based on a determining result, to ensure that the quantity of bit errors that is sent by the transmit end of the network device to the second node does not exceed N. Specifically, if the third check value is greater than N, some network devices in the entire network possibly cannot work normally. In this embodiment, the second check value may be set to N, that is, the value of the bit error counter is updated to N. On the contrary, if the third check value is less than or equal to N, the second check value may be set to the third check value, that is, the third check value is stored as the second check value, that is, the value of the bit error counter is updated to the third check value.

Before sending the second signal stream to the second node, the network device may query the value of the bit error counter to obtain the second check value. Because the second check value is less than or equal to N, the second check value may be determined as the target check value. Then, the network device assigns the target check value to the REI, and sends the value to the second node. In this way, even if a quantity of bit errors that is indicated by a bit error result counted inside the network device exceeds 8 or 16, a solution of the REI that occupies 4 bits can be compatible. In addition, because a value indicated by the REI does not exceed 8, even if a frequency offset exists between the receive end and the transmit end of the network device, an existing O-code protocol can be compatible, to ensure that each device in the network works normally.

It should be understood that, after sending the second signal stream to the second node, the network device sets the value of the bit error counter to 0, to avoid an incorrect accumulation result caused by repeatedly accumulating a previous bit error result.

Solution 2: After obtaining the first check value, the network device may accumulate the first check value and a value of the bit error counter. Different from Solution 1, in this solution, before sending the second signal stream, after querying the bit error counter, the network device processes an obtained check value to obtain the target check value, and then sends, to the second node, the second signal stream that carries the target check value.

For example, the network device receives the first signal stream, obtains the first check value, reads a current value of the bit error counter, and performs a summation operation on the first check value and the current value to obtain a third check value. The network device stores the third check value in the bit error counter as the second check value, that is, stores the third check value in the bit error counter.

Before sending the second signal stream to the second node, the network device may query the value of the bit error counter to obtain the second check value. Because the third check value is a result obtained through accumulation, the third check value may be greater than 8 or 16, or may be less than or equal to 8 or 16. If the third check value is directly carried by using the REI, it cannot be ensured that the REI that occupies 4 bits can carry the third check value. Therefore, in this embodiment, the network device may determine, based on a magnitude of the third check value, a check value, namely, the target check value, that needs to be sent to the second node, to ensure that the target check value is less than or equal to 8 or 16.

For example, the network device may compare the third check value with a preset threshold N (for example, 8). If the third check value is greater than N, N is used as the target check value, and is assigned to REI, and the second signal stream that carries the REI is sent to the second node. On the contrary, if the third check value is less than or equal to N, the third check value may be assigned to the REI as the target check value, and the second signal stream that carries the REI is sent to the second node. Because the target check value carried in the second signal stream sent by the network device to the second node does not exceed N, even if a quantity of bit errors that is indicated by a bit error result counted inside the network device exceeds 8 or 16, a solution of the REI that occupies 4 bits can be compatible. In addition, because a value indicated by the REI does not exceed 8, even if a frequency offset exists between the receive end and the transmit end of the network device, an existing O-code protocol can be compatible, to ensure that each device in the network works normally.

It should be understood that, after sending the second signal stream to the second node, the network device sets the value of the bit error counter to 0, to avoid an incorrect accumulation result caused by repeatedly accumulating a previous bit error result.

Solution 3: The network device updates the first check value to the bit error counter, and before sending the second signal stream, the network device may use, as the target check value, a check value obtained by querying the bit error counter. A difference between this solution and each of Solution 1 and Solution 2 lies in that the network device does not accumulate the first check value and the bit error result, but uses the first check value obtained through current calculation as the second check value, namely, a bit error result that needs to be stored in the bit error counter. Because a quantity of bit errors in single check does not exceed 8, it can be ensured that a check value stored in the bit error counter does not exceed 8. Therefore, the bit error result is indicated by using the REI that occupies 4 bits. In addition, because a value indicated by the REI does not exceed 8, even if a frequency offset exists between the receive end and the transmit end of the network device, an existing O-code protocol can be compatible, to ensure that each device in the network works normally.

For example, after receiving the first signal stream, the network device obtains the first check value, and updates the first check value to the bit error counter, that is, updates the current value of the bit error counter to the first check value. It should be understood that if the current value of the bit error counter is 0, the network device may write the first check value to the bit error counter. If the current value of the bit error counter is not 0, the network device may first delete the current value of the bit error counter, and then write the first check value to the bit error counter, that is, overwrite the current value by using the first check value. Before sending the second signal stream, the network device uses, as the target check value, a check value obtained by querying the bit error counter, that is, assigns the first check value to the REI as the target check value. In this solution, a new bit error result is used to overwrite a bit error result stored in the bit error counter, so that a quantity of bit errors that is in the bit error counter always does not exceed 8. Therefore, the bit error result can be accurately indicated by using the REI that occupies 4 bits.

Solution 4: After obtaining the first check value, the network device may determine, based on a current value of the bit error counter, the second check value to be stored in the bit error counter.

For example, after receiving the first signal stream and obtaining the first check value, the network device may determine whether the current value of the bit error counter is 0. If the current value of the bit error counter is 0, the network device may store the first check value in the bit error counter as the second check value. If the current value of the bit error counter is not 0, the network device may discard the first check value, that is, discard a currently counted bit error result. To be specific, a bit error result stored in the bit error counter remains unchanged, that is, the second check value is the current value of the bit error counter. It may be learned that a difference between this solution and Solution 3 lies in that when the current value of the bit error counter is not 0, in Solution 3, the obtained first check value is updated to the bit error counter, and in this solution, the first check value is discarded, so that the value of the bit error counter remains unchanged.

Before sending the second signal stream, the network device uses, as the target check value, a check value obtained by querying the bit error counter, that is, assigns the first check value to the REI as the target check value. In this solution, a new bit error result is used to overwrite a bit error result stored in the bit error counter, so that a quantity of bit errors that is in the bit error counter always does not exceed 8. Therefore, the bit error result can be accurately indicated by using the REI that occupies 4 bits.

It should be understood that, after sending the second signal stream to the second node, the network device sets the value of the bit error counter to 0, to avoid an incorrect accumulation result caused by repeatedly accumulating a previous bit error result.

Solution 5: The network device may dispose a counter, to limit a quantity of times of accumulating a bit error result, to limit the bit error result, so that the quantity of bit errors that is indicated by the bit error result does not exceed 8 or 16, and the bit error result can be accurately indicated by using the REI that occupies 4 bits. In addition, it is ensured that even if a frequency offset exists between a receive end and a transmit end of the network device, an existing O-code protocol can be compatible, to ensure that each device in a network works normally.

Figure 14:
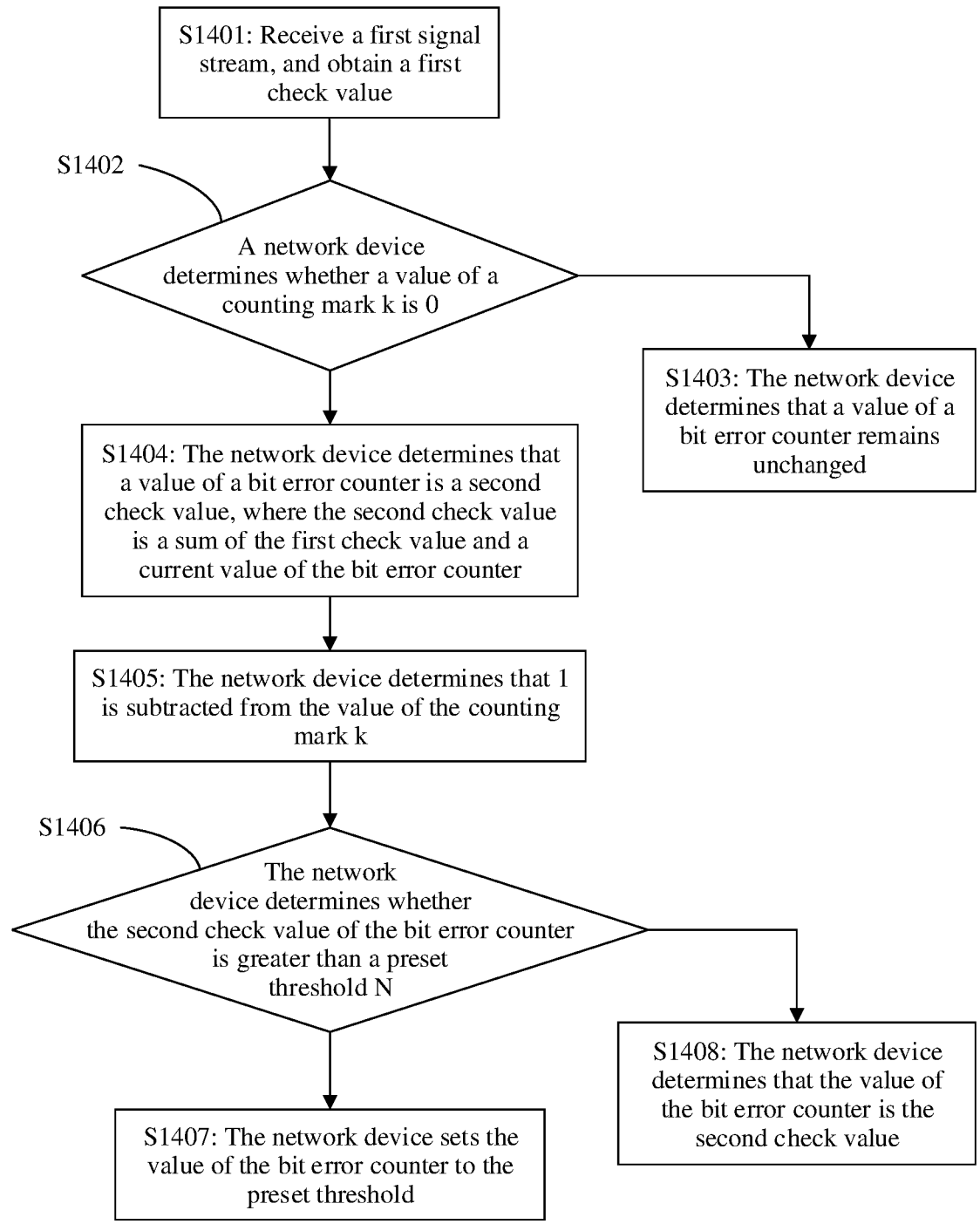
FIG. 14 is another schematic flowchart of a bit error indication method for a service stream according to an embodiment of the present disclosure.

For example, FIG. 14 is a schematic flowchart of a parity-check result feedback method according to an embodiment of the present disclosure. The method includes the following steps.

S1401. The network device receives a first signal stream, and obtains a first check value.

S1402. The network device determines whether a value of a preset counting mark k is 0.

S1403. If the value of the counting mark k is 0, the network device determines that a value of a bit error counter remains unchanged.

S1404. If the value of the counting mark k is not 0, the network device determines that a value of a bit error counter is a third check value, where the third check value is a sum of the first check value and a current value of the bit error counter.

In this embodiment, an initial value may be set for the counting mark k. For example, the value of the counting mark k may be set to m. It should be understood that m is less than or equal to a maximum value of the counting mark k. Each time the network device accumulates a bit error result, an operation of subtracting 1 from the value of the counting mark k can be performed. In this way, a quantity of times of accumulating the bit error result can be limited by limiting the value of the counting mark k. If the value of the counting mark k is 0, when the bit error result continues to be accumulated, a quantity of bit errors that is indicated by the bit error result may exceed 8 or 16. Therefore, when the value of the counting mark k is 0, the network device determines not to continue to accumulate the bit error result. For example, the value of the bit error counter remains unchanged, that is, a current bit error result is discarded. In this way, it can be ensured that the value of the bit error counter does not exceed 8. If the value of the counting mark k is not 0, when the bit error result continues to be accumulated, a bit error result obtained after accumulation may not exceed 8. To obtain a more accurate quantity of bit errors, when the value of the counting mark k is not 0, the network device may accumulate the first check value and a value of the bit error counter, so that the value of the bit error counter is updated from the current value to the third check value.

S1405. The network device determines that 1 is subtracted from the value of the counting mark k.

S1406. The network device determines whether the third check value of the bit error counter is greater than a preset threshold N.

S1407. If the third check value is greater than the preset threshold N, the network device sets the value of the bit error counter to the preset threshold.

S1408. If the third check value is less than or equal to the preset threshold N, the network device determines that the value of the bit error counter is the second check value.

If the value of the counting mark k is not 0, when the bit error result continues to be accumulated, a bit error result obtained after accumulation may exceed 8. Therefore, the network device may determine whether the bit error result obtained after accumulation, namely, the second check value, is greater than the preset threshold N, and determine the value of the bit error counter based on a determining result, to ensure that a quantity of bit errors that is sent by the transmit end of the network device to the second node does not exceed N. Specifically, if the second check value is greater than N, some network devices in the entire network possibly cannot work normally. In this case, in this embodiment, the value of the bit error counter may be set to N. On the contrary, if the second check value is less than or equal to N, the value of the bit error counter may be set to the second check value. Before sending a second signal stream to a second node, the network device may query the value of the bit error counter to obtain the second check value. Because the second check value is less than or equal to N, the second check value may be determined as a target check value. Then, the network device assigns the target check value to a REI, and sends the value to the second node. In this way, even if a quantity of bit errors that is indicated by a bit error result counted inside the network device exceeds 8 or 16, a solution of the REI that occupies 4 bits can be compatible. In addition, because a value indicated by the REI does not exceed 8, even if a frequency offset exists between the receive end and the transmit end of the network device, an existing O-code protocol can be compatible, to ensure that each device in the network works normally.

It should be understood that, after sending the second signal stream to the second node, the network device sets the value of the bit error counter to 0, to avoid an incorrect accumulation result caused by repeatedly accumulating a previous bit error result. In addition, the network device determines that the value of the counting mark k is increased by 1, to prevent the network device from discarding a newly counted bit error result each time.

In any one of the foregoing five solutions provided in this embodiment, a value of the REI carried in the second signal stream sent by the network device to the second node may not exceed 8 or 16. Therefore, even if a quantity of bit errors that is indicated by a bit error result counted inside the network device exceeds 8 or 16 because a frequency offset exists between the transmit end and the receive end of the network device, the bit error result can be accurately indicated by using the REI that occupies 4 bits, to ensure that each device in a network works normally.

Figure 15:
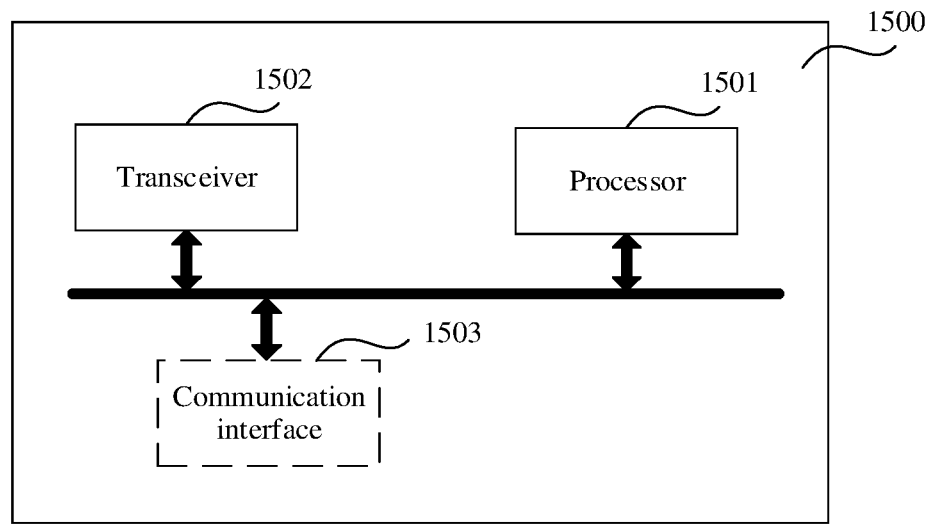
FIG. 15 is a schematic diagram of a structure of a network device according to an embodiment of the present disclosure.

Based on the foregoing content and a same concept, FIG. 15 is a schematic diagram of a structure of a communication apparatus 1500. The communication apparatus 1500 may correspondingly implement a function or a step implemented by the network device in the foregoing method embodiments. The communication apparatus may be a network device (for example, a switch), or may be a chip or a circuit, for example, a chip or a circuit that may be disposed in the network device. The communication apparatus 1500 may include a processor 1501 and a transceiver 1502. The processor 1501 and the transceiver 1502 may be connected to each other by using a bus system. Optionally, the communication apparatus may further include a memory, and the memory may be configured to store instructions (a code or a program) and/or data. The transceiver 1502 and the processor 1501 may be coupled to the memory, for example, the processor 1501 may read the instructions (a code or a program) and/or the data in the memory unit to implement a corresponding method. The foregoing units may be independently disposed, or may be partially or totally integrated. For example, the transceiver 1502 may include a transmitter and a receiver that are independently disposed. Optionally, the communication apparatus 1500 may further include a communication interface 1503, and the communication interface 1503 is configured to input and/or output information. The processor 1501 is configured to execute a computer program or instructions, so that the communication apparatus 1500 implements the method performed by the network device in the foregoing related solution in FIG. 13 or FIG. 14. The communication interface 1503 is optional, and therefore is shown by using a dashed line in FIG. 15.

It should be understood that the processor 1501 may be a chip. The processor may be a field-programmable gate array (FPGA), an application-specific integrated circuit (ASIC), a system on chip (SoC), or a central processor unit (CPU), a network processor (NP), a digital signal processor (DSP), a micro controller unit (MCU), or a programmable logic device (PLD) or another integrated chip.

In an implementation process, the steps in the foregoing methods can be implemented by using a hardware integrated logic circuit in the processor, or by using instructions in a form of software. The steps of the method disclosed with reference to embodiments of the present disclosure may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It should be noted that the processor 1501 in embodiments of the present disclosure may be an integrated circuit chip, and has a signal processing capability. In an implementation process, the steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps in the methods disclosed with reference to embodiments of the present disclosure may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of the present disclosure may be a volatile memory or a non-volatile memory, or may include a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch-link dynamic random access memory (synchlink DRAM, SLDRAM), and a direct rambus random access memory (direct rambus RAM, DR RAM). It should be noted that the memory in the systems and methods described in this specification includes but is not limited to these and any memory of another appropriate type.

In some embodiments, the communication apparatus 1500 can correspondingly implement a behavior and a function of the network device in the foregoing method embodiments. For example, the communication apparatus 1500 may be a network device, or may be a component (such as a chip or a circuit) applied to the network device. The communication apparatus 1500 may include the processor 1501 and the transceiver 1502. The transceiver 1502 may be configured to perform all receiving or sending operations performed by the network device in the embodiment shown in FIG. 13 or FIG. 14, for example, S1301 and S1303 in the embodiment shown in FIG. 13, and/or configured to support another process of the technology described in this specification. The processor 1501 is configured to perform an operation other than all receiving or sending operations performed by the network device in the embodiment shown in FIG. 13 or FIG. 14, for example, S1302 in the embodiment shown in FIG. 13, and/or configured to support another process of the technology described in this specification, for example, S1401 to S1408 in the embodiment shown in FIG. 14, and/or configured to support another process of the technology described in this specification.

For example, the transceiver 1502 is configured to receive a first signal stream from a first node by using N slots of a first bonding group, where the first signal stream includes a first check code, the first check code is used to determine a quantity of bit errors included in the first signal stream, the first bonding group includes P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1.

The processor 1501 is configured to: determine a first check value based on the first check code, determine a second check value based on the first check value and a current check value, and update the current check value by using the second check value, where the current check value is a check value stored by the network device before receiving the first signal stream.

The transceiver 1502 is configured to send a second signal stream to a second node by using M slots of the first bonding group, where the second signal stream includes a second check code, the second check code includes a target check value, the target check value is determined based on the second check value, the target check value is less than or equal to a preset threshold, and M is an integer greater than or equal to 1.

In a possible implementation, the processor 1501 is specifically configured to:
  perform summation on the first check value and the current check value to obtain a third check value; and
  when the third check value is greater than the preset threshold, determine the preset threshold as the second check value; or when the third check value is less than or equal to the preset threshold, determine the third check value as the second check value.

In a possible implementation, the processor 1501 is specifically configured to:
perform summation on the first check value and the current check value to obtain a third check value; and
determine the third check value as the second check value.

In a possible implementation, when the second check value is greater than the preset threshold, the target check value is the preset threshold; or
when the second check value is less than or equal to the preset threshold, the target check value is the second check value.

In a possible implementation, the processor 1501 is specifically configured to:
use the first check value as the second check value.

In a possible implementation, the processor 1501 is specifically configured to:
when the current check value is 0, determine the first check value as the second check value; or
when the current check value is not 0, determine the current check value as the second check value.

In a possible implementation, the processor 1501 is specifically configured to:
determine whether a current value of a preset counting mark k is 0;
if the current value of the counting mark k is 0, determine that the second check value is the current check value; or if the current value of the counting mark k is not 0, perform summation on the first check value and the current check value to obtain a third check value; and
if the third check value is greater than the preset threshold, determine the preset threshold as the second check value; or
if determining that the third check value is less than or equal to the preset threshold, determine the third check value as the second check value.

For concepts, explanations, and detailed descriptions that are of the communication apparatus 1500 and that are related to the technical solution provided in this embodiment, and other steps, refer to descriptions of the content in the foregoing method or other embodiments, and details are not described herein again.

Figure 16:
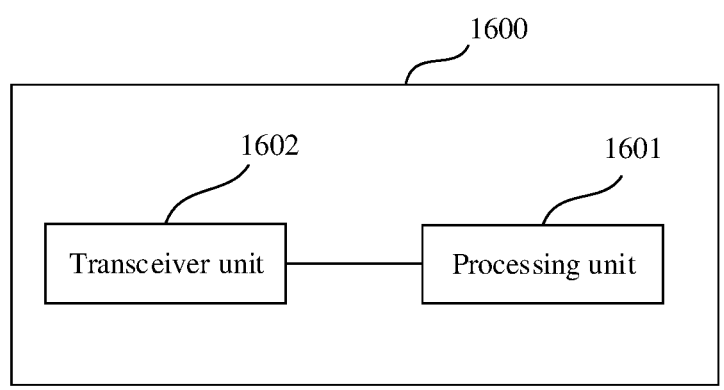
FIG. 16 is a schematic diagram of another structure of a network device according to an embodiment of the present disclosure.

FIG. 16 is a schematic diagram of another structure of a communication apparatus according to an embodiment of the present disclosure. As shown in FIG. 16, a communication apparatus 1600 may include a processing unit 1601 and a transceiver unit 1602. It should be understood that unit division of the communication apparatus 1600 is merely logical function division. In actual implementation, all or a part of the units may be integrated into one physical entity, or may be physically separated. In this embodiment, the transceiver unit 1602 may be implemented by the transceiver 1502 in FIG. 15, and the processing unit 1601 may be implemented by the processor 1501 in FIG. 15.

The communication apparatus 1600 can correspondingly implement a step performed by the network device in the foregoing method embodiments. For example, the communication apparatus 1600 may be a network device, or may be a component (such as a chip or a circuit) applied to the network device.

In a possible implementation, the transceiver unit 1602 is configured to receive a first signal stream from a first node by using N slots of a first bonding group, where the first signal stream includes a first check code, the first check code is used to determine a quantity of bit errors included in the first signal stream, the first bonding group includes P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1.

The processing unit 1601 is configured to: determine a first check value based on the first check code, determine a second check value based on the first check value and a current check value, and update the current check value by using the second check value, where the current check value is a check value stored by the network device before receiving the first signal stream.

The transceiver unit 1602 is configured to send a second signal stream to a second node by using M slots of the first bonding group, where the second signal stream includes a second check code, the second check code includes a target check value, the target check value is determined based on the second check value, the target check value is less than or equal to a preset threshold, and M is an integer greater than or equal to 1.

In a possible implementation, the processing unit 1601 is specifically configured to:
perform summation on the first check value and the current check value to obtain a third check value; and
when the third check value is greater than the preset threshold, determine the preset threshold as the second check value; or when the third check value is less than or equal to the preset threshold, determine the third check value as the second check value.

In a possible implementation, the processing unit 1601 is specifically configured to:
perform summation on the first check value and the current check value to obtain a third check value; and
determine the third check value as the second check value.

In a possible implementation, when the second check value is greater than the preset threshold, the target check value is the preset threshold; or
when the second check value is less than or equal to the preset threshold, the target check value is the second check value.

In a possible implementation, the processing unit 1601 is specifically configured to:
use the first check value as the second check value.

In a possible implementation, the processing unit 1601 is specifically configured to:
when the current check value is 0, determine the first check value as the second check value; or
when the current check value is not 0, determine the current check value as the second check value.

In a possible implementation, the processing unit 1601 is specifically configured to:
determine whether a current value of a preset counting mark k is 0;
if the current value of the counting mark k is 0, determine the current check value as the second check value; or if the current value of the counting mark k is not 0, perform summation on the first check value and the current check value to obtain a third check value; and
if the third check value is greater than the preset threshold, determine the preset threshold as the second check value; or
if determining that the third check value is less than or equal to the preset threshold, determine the third check value as the second check value.

For concepts, explanations, and detailed descriptions that are of the communication apparatus 1600 and that are related to the technical solution provided in this embodiment, and other steps, refer to descriptions of the content in the foregoing method or other embodiments, and details are not described herein again. It may be understood that for functions of the units in the communication apparatus 1600, refer to implementation of a corresponding method embodiment. Details are not described herein again.

An embodiment of the present disclosure further provides a communication system, including the foregoing communication apparatus configured to execute a plurality of solutions on a network device side.

The present disclosure further provides a computer program product. The computer program product includes a computer program code. When the computer program code is run on a computer, the computer is enabled to perform the method in either of the embodiment shown in FIG. 13 or FIG. 14.

Based on the method provided in the embodiments of the present disclosure, the present disclosure further provides a computer-readable storage medium. The computer-readable storage medium stores a program code. When the program code is run on a computer, the computer is enabled to perform the method in either of the embodiment shown in FIG. 13 or FIG. 14.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network node the foregoing apparatus embodiments corresponds to the first node or the second node in the method embodiments, and corresponding modules or units perform corresponding steps, for example, the communication unit (transceiver) performs a receiving or sending step in the method embodiments, and another step other than the sending and receiving steps may be performed by the processing unit (processor). For a function of a specific unit, refer to the corresponding method embodiments. There may be one or more processors.

Terminologies such as "component", "module", and "system" used in the present disclosure are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the Internet interacting with other systems by using the signal).

The terms "system" and "network" may be used interchangeably in embodiments of the present disclosure. "At least one" means one or more, and "a plurality of" means two or more. And/or describes an association relationship between associated objects, and represents that three relationships may exist. For example, A and/or B may represent any of the following cases: Only A exists, both A and B exist, or only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of the present disclosure are for distinguishing between a plurality of objects, but are not intended to limit an order, a time sequence, priorities, or importance of the plurality of objects. For example, a first message and a second message are merely used to distinguish different messages, and are not used to indicate different priorities, sending sequences, or importance degrees of the two types of messages.

It should be understood that sequence numbers of the foregoing processes do not mean execution sequences in embodiments of the present disclosure. The execution sequences of the processes should be determined based on functions and internal logic of the processes, and should not constitute any limitation on implementation processes of the embodiments of the present disclosure.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in the present disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A bit error indication method, comprising:
   receiving, by a network device, a first signal stream from a first node by using N slots of a first bonding group, wherein the first signal stream comprises a first check code for determining a quantity of bit errors comprised in the first signal stream, the first bonding group comprises P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1;
   determining, by the network device, a first check value indicating the quantity of bit errors comprised in the first signal stream based on the first check code, determining a second check value based on the first check value and a current check value, and updating the current check value by using the second check value, wherein the current check value is a check value stored by the network device before receiving the first signal stream; and
   sending, by the network device, a second signal stream to a second node by using M slots of the first bonding group, wherein the second signal stream comprises a second check code, the second check code comprises a target check value, the target check value is determined based on the second check value, the target check value is less than or equal to a preset threshold, and M is an integer greater than or equal to 1.

2. The method according to claim 1, wherein the determining a second check value based on the first check value and a current check value comprises:
   performing, by the network device, summation on the first check value and the current check value to obtain a third check value; and
   in response to the third check value being greater than the preset threshold, determining, by the network device, the preset threshold as the second check value; or in response to the third check value being less than or equal to the preset threshold, determining, by the network device, the third check value as the second check value.

3. The method according to claim 1, wherein the determining a second check value based on the first check value and a current check value comprises:
   performing, by the network device, summation on the first check value and the current check value to obtain a third check value; and
   determining, by the network device, the third check value as the second check value.

4. The method according to claim 1, wherein in response to the second check value being greater than the preset threshold, the target check value is set to be the preset threshold; or in response to the second check value being less than or equal to the preset threshold, the target check value is set to be the second check value.

5. The method according to claim 1, wherein the determining a second check value based on the first check value and a current check value comprises:
   determining, by the network device, the first check value as the second check value.

6. The method according to claim 1, wherein the determining a second check value based on the first check value and a current check value comprises:
   in response to the current check value being 0, determining, by the network device, the first check value as the second check value; and
   in response to the current check value not being 0, determining, by the network device, the current check value as the second check value.

7. The method according to claim 1, wherein the determining a second check value based on the first check value and a current check value comprises:
   determining, by the network device, whether a current value of a preset counting mark k is 0;
   in response to the current value of the preset counting mark k being 0, determining, by the network device, the current check value as the second check value; or in response to the current value of the preset counting mark k not being 0, performing, by the network device, summation on the first check value and the current check value to obtain a third check value; and in response to the third check value being greater than the preset threshold, determining, by the network device, the preset threshold as the second check value, or in response to the third check value being less than or equal to the preset threshold, determining, by the network device, the third check value as the second check value.

8. A communication apparatus, comprising at least one processor and a transceiver, wherein the transceiver is configured to receive a first signal stream from a first node by using N slots of a first bonding group, wherein the first signal stream comprises a first check code for determining a quantity of bit errors comprised in the first signal stream, wherein the first bonding group comprises P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1;

the at least one processor is configured to determine a first check value indicating the quantity of bit errors comprised in the first signal stream based on the first check code, determine a second check value based on the first check value and a current check value, and update the current check value by using the second check value, wherein the current check value is a check value stored by the communication apparatus before receiving the first signal stream and the second check value that is determined to be stored in a bit error counter; and the transceiver is further configured to send a second signal stream to a second node by using M slots of the first bonding group, wherein the second signal stream comprises a second check code, the second check code comprises a target check value, the target check value is determined based on the second check value, the target check value is less than or equal to a preset threshold, and M is an integer greater than or equal to 1.

9. The communication apparatus according to claim 8, wherein the determination of the second check value comprises:

performing summation on the first check value and the current check value to obtain a third check value; and when the third check value is greater than the preset threshold, determining the preset threshold as the second check value; or when the third check value is less than or equal to the preset threshold, determining the third check value as the second check value.

10. The communication apparatus according to claim 8, wherein the determination of the second check value comprises:

performing summation on the first check value and the current check value to obtain a third check value; and determining the third check value as the second check value.

11. The communication apparatus according to claim 10, wherein when the second check value is greater than the preset threshold, the target check value is set to be the preset threshold; or when the second check value is less than or equal to the preset threshold, the target check value is set to be the second check value.

12. The communication apparatus according to claim 8, wherein the determination of the second check value comprises: determining the first check value as the second check value.

13. The communication apparatus according to claim 8, wherein the determination of the second check value comprises:

when the current check value is 0, determining the first check value as the second check value; or when the current check value is not 0, determining the current check value as the second check value.

14. The communication apparatus according to claim 8, wherein the determination of the second check value comprises:

determining whether a current value of a preset counting mark k is 0;

when the current value of the preset counting mark k is 0, determining the current check value as the second check value, or when the current value of the preset counting mark k is not 0, performing summation on the first check value and the current check value to obtain a third check value; and when the third check value is greater than the preset threshold, determining the preset threshold as the second check value, or when the third check value is less than or equal to the preset threshold, determining the third check value as the second check value.

15. A non-transitory, storage medium storing information comprising instructions that, when executed by at least one processor, control a network device to perform operations comprising:

receiving a first signal stream from a first node by using N slots of a first bonding group, wherein the first signal stream comprises a first check code for determining a quantity of bit errors comprised in the first signal stream, the first bonding group comprises P physical layer (PHY) links, a bandwidth resource of each PHY link is divided into Q slots, a bandwidth resource of the first bonding group is divided into P*Q slots, N is less than or equal to P*Q, and N, P, and Q are all integers greater than or equal to 1;

determining a first check value indicating the quantity of bit errors comprised in the first signal stream based on the first check code, determining a second check value based on the first check value and a current check value, and updating the current check value by using the second check value, wherein the current check value is a check value stored by the network device before receiving the first signal stream; and sending a second signal stream to a second node by using M slots of the first bonding group, wherein the second signal stream comprises a second check code, the second check code comprises a target check value, the target check value is determined based on the second check value, the target check value is less than or equal to a preset threshold, and M is an integer greater than or equal to 1.

16. The non-transitory storage medium according to claim 15, wherein the determining of the second check value comprises:

performing summation on the first check value and the current check value to obtain a third check value; and in response to the third check value being greater than the preset threshold, determining the preset threshold as the second check value; or in response to the third check value being less than or equal to the preset threshold, determining the third check value as the second check value.

17. The non-transitory storage medium according to claim 15, wherein the determining of the second check value comprises:
performing summation on the first check value and the current check value to obtain a third check value; and
determining the third check value as the second check value.

18. The non-transitory storage medium according to claim 15, wherein in response to the second check value being greater than the preset threshold, the target check value is set to be the preset threshold; or in response to the second check value being less than or equal to the preset threshold, the target check value is set to be the second check value.

19. The non-transitory storage medium according to claim 15, wherein the determining of the second check value comprises:
determining the first check value as the second check value.

20. The non-transitory storage medium according to claim 15, wherein the determining of the second check value comprises:
in response to the current check value being 0, determining the first check value as the second check value; and
in response to the current check value not being 0, determining the current check value as the second check value.

* * * * *